(12) United States Patent
Kondo et al.

(10) Patent No.: US 11,791,526 B2
(45) Date of Patent: Oct. 17, 2023

(54) HIGH FREQUENCY TRANSMISSION DEVICE AND HIGH FREQUENCY SIGNAL TRANSMISSION METHOD

(71) Applicant: HOSIDEN CORPORATION, Yao (JP)

(72) Inventors: Hayato Kondo, Yao (JP); Kosuke Sasada, Yao (JP)

(73) Assignee: HOSIDEN CORPORATION, Yao (JP)

( * ) Notice: Subject to any disclaimer, the term of this patent is extended or adjusted under 35 U.S.C. 154(b) by 300 days.

(21) Appl. No.: 17/297,135

(22) PCT Filed: Oct. 15, 2019

(86) PCT No.: PCT/JP2019/040518
§ 371 (c)(1),
(2) Date: May 26, 2021

(87) PCT Pub. No.: WO2020/110491
PCT Pub. Date: Jun. 4, 2020

(65) Prior Publication Data
US 2022/0029264 A1 Jan. 27, 2022

(30) Foreign Application Priority Data

Nov. 28, 2018 (JP) ................ 2018-222287

(51) Int. Cl.
*H01P 3/08* (2006.01)
*H04B 1/02* (2006.01)
*H04B 3/52* (2006.01)

(52) U.S. Cl.
CPC .............. *H01P 3/08* (2013.01); *H04B 1/02* (2013.01); *H04B 3/52* (2013.01)

(58) Field of Classification Search
CPC .............. H01P 3/08; H04B 1/02; H04B 3/52
See application file for complete search history.

(56) References Cited

U.S. PATENT DOCUMENTS 5,160,906 A * 11/1992 Siomkos ................. H01P 3/085
333/204
5,534,830 A * 7/1996 Ralph .................. H03D 9/0633
336/200
(Continued)

FOREIGN PATENT DOCUMENTS

CN          101547553 A     9/2009
EP           0735606 A1    10/1996
(Continued)

OTHER PUBLICATIONS

Saiki et al., Appearance of ferromagnetism property for Si nano-polycrystalline body and vanishing of electrical resistances at local high frequencies, Journal of Nanomaterials, 2018, 9260280 (2018), Faculty of Engineering Science, Kansai University, Japan (24 pages).

(Continued)

*Primary Examiner* — Samuel S Outten
(74) *Attorney, Agent, or Firm* — Kilyk & Bowersox, P.L.L.C.

(57) ABSTRACT

A polycrystal having a physical property that enables an AC resistance value to drop sharply is used to reduce transmission loss of a high frequency signal being transmitted. A high frequency transmission device D1 is provided that includes a dielectric 100 and a transmission line 200 adapted for transmitting therethrough high frequency signals. At least part of the transmission line 200 is located on or inside the dielectric 100. At least part of the transmission line 200 is composed of a polycrystal composed of conductor fine particles. The polycrystal has a physical property such that, when a high frequency signal to be transmitted through the transmission line 200 is of frequencies within one or more specific frequency bands, the AC resistance value drops sharply.

28 Claims, 13 Drawing Sheets

(56) References Cited

U.S. PATENT DOCUMENTS

| | | | |
|---|---|---|---|
| 2007/0188275 A1* | 8/2007 | Wakabayashi | H01P 3/18 |
| | | | 333/238 |
| 2009/0242253 A1 | 10/2009 | Muro et al. | |
| 2013/0257682 A1 | 10/2013 | Yoshida et al. | |
| 2019/0089031 A1* | 3/2019 | Tcaciuc | H10N 60/30 |

FOREIGN PATENT DOCUMENTS

| | | | |
|---|---|---|---|
| JP | 2007-221713 A | 8/2007 |
| JP | 2013-229851 A | 11/2013 |
| JP | 2016-195394 A | 11/2016 |
| JP | 6080020 B | 2/2017 |

OTHER PUBLICATIONS

Office action dated Oct. 11, 2021, issued by the CNIPA, for Chinese patent application No. 201980078205.2, with translation (19 pages).
Office action dated Dec. 6, 2021, issued by the EPO, for European patent application No. 19890230.6 (12 pages).

* cited by examiner

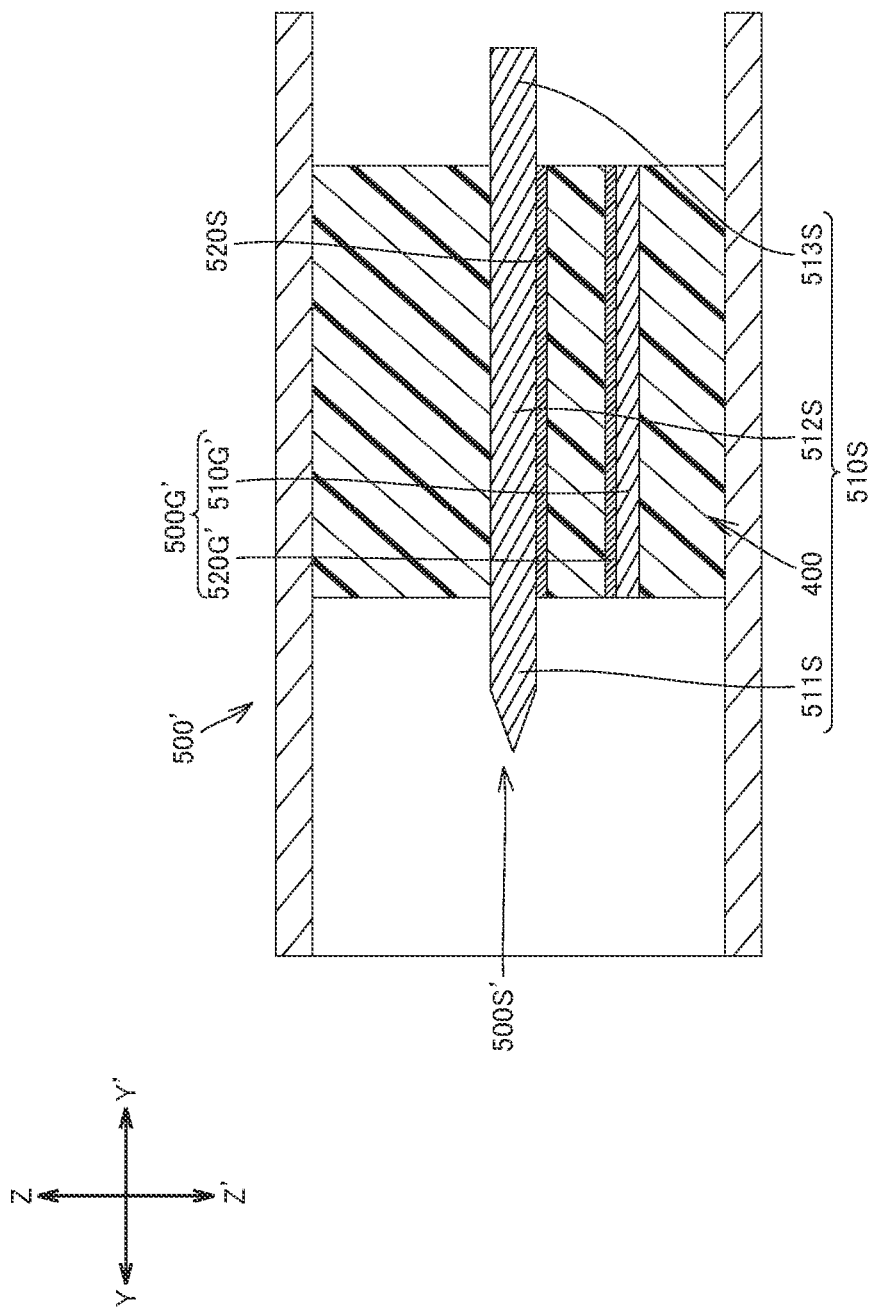

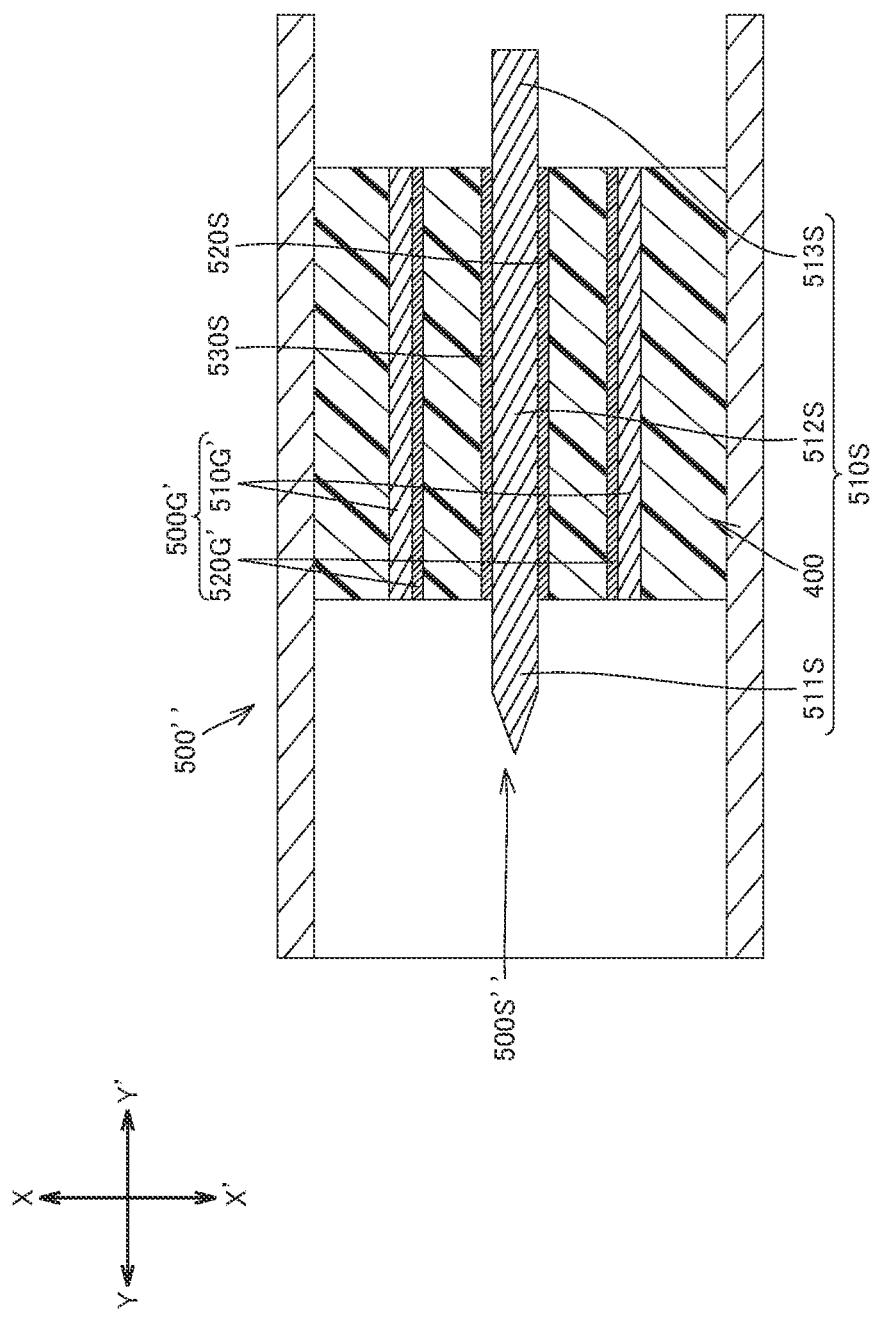

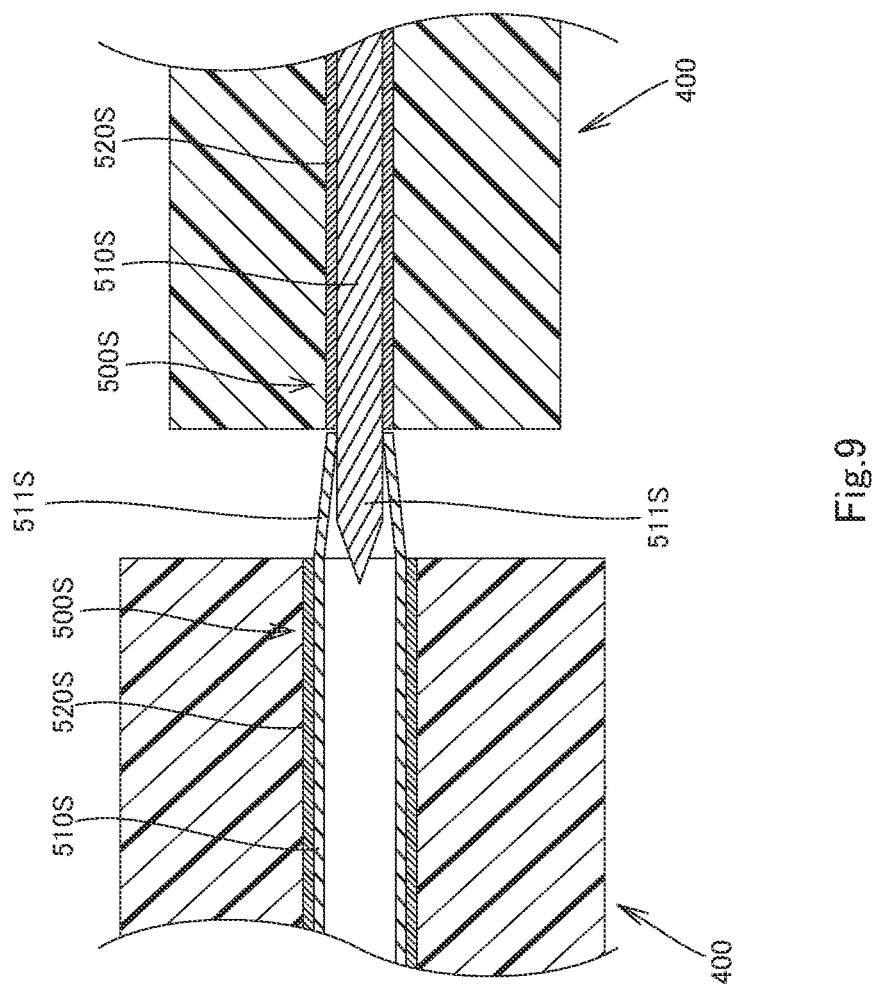

HIGH FREQUENCY TRANSMISSION DEVICE AND HIGH FREQUENCY SIGNAL TRANSMISSION METHOD

TECHNICAL FIELD

The invention relates to high frequency transmission devices and high frequency signal transmission methods.

BACKGROUND ART

Generally, when passing an alternating current through metal, skin effect causes the alternating current to flow near the surface of the metal but hardly flow toward the central portion of the metal, resulting in increase of the alternating current resistance (AC) value of the metal. This is because a counter-electromotive force is generated in the central portion of the metal, so that a current is hard to flow. Since a high frequency signal works in the same manner as an alternating current, when passing a high frequency signal through a transmission line made of metal, the AC resistance value of the transmission line increases, making the high frequency signal more susceptible to transmission loss (attenuation).

The Non-Patent Literature 1 identified below describes a polycrystal composed of iron nanoparticles or metal grade silicon nanoparticles. The polycrystal composed of iron nanoparticles are obtained by reducing and converting high-purity iron oxide fine powder into nanoparticles by a laser ablation in liquid method, and then making the nanoparticles into a paste, and sintering the iron nano paste at 250 degrees using an electric hot plate.

CITATION LIST

Patent Literature

Non-Patent Literature 1: Taku Saiki (Associate Professor; Department of Electrical, Electronic and Information Engineering; Faculty of Engineering Science; Kansai University), "Special behavior of sintered nanostructured metals— Loss of electrical resistance at high frequencies in the MHz band-" [online], Announced Jun. 25, 2018; Searched on Oct. 29, 2018 on the Internet (URL: http://www.microwave.densi.kansai-u.ac.jp/face/%E3%83%97%E3%83%AC%E3%82%B9%E3%83%AA%E3%83%AA%E3%83%BC%E3%82%B920180625v2.pdf)

SUMMARY OF INVENTION

Technical Problem

When passing an alternating current of frequencies between 3 MHz and 5 MHz through the polycrystal composed of iron nanoparticles described above, a result has been obtained that the measured AC resistance value of the polycrystal is substantially 0 mΩ. This result indicates that the polycrystal has a physical property that the AC resistance value becomes substantially 0 mΩ when passing an AC current of frequencies between 3 MHz and 5 MHz. It should be noted that the polycrystal composed of metal grade silicon nanoparticles can also be obtained by a similar production method to the method described above and has a similar physical property.

The invention provides a high frequency transmission device and a high frequency signal transmission method capable of reducing transmission loss of a high frequency signal using the polycrystal or other resistance reducing material having a physical property that the AC resistance value drops sharply when transmitting a high frequency signal.

Solution to Problem

To solve the above problems, A high frequency transmission device of an aspect of the invention includes a dielectric and a transmission line adapted for transmitting therethrough high frequency signals. At least part of the transmission line is located on or inside the dielectric. At least part of the transmission line is composed of a resistance reducing material composed of fine particles. The resistance reducing material has a physical property that where a high frequency signal to be transmitted through the transmission line is of frequencies within one or more specific frequency bands, an alternating current resistance value of the resistance reducing material drops sharply. Alternatively, the resistance reducing material has a physical property that a direction of an induced electromotive force (counter-electromotive force) generated in a central portion of the resistance reducing material is reversed in a case where a high frequency signal to be transmitted through the transmission line is of frequencies within one or more specific frequency bands, the induced electromotive force being generated due to a magnetic field generated due to the high frequency signal.

It should be noted that the at least part of the transmission line that is provided at the dielectric may be the same as, or different from, the at least part of the transmission line that is composed of the resistance reducing material.

In the high frequency transmission device of this aspect, where a high frequency signal to be transmitted through the transmission line is of frequencies within the one or more specific frequency bands, an alternating current (AC) resistance value of the resistance reducing material drops sharply. This reduces transmission loss of the high frequency signal.

The fine particles may be conductor fine particles or semiconductor fine particles. In the former case, the resistance reducing material may be composed of a polycrystal composed of conductor fine particles. In the latter case, the resistance reducing material may be composed of semiconductor fine particles.

The transmission line may include at least one signal conductor and a first ground conductor. At least part of the or each signal conductor may be provided on or inside the dielectric. The first ground conductor may extend along at least part of the or each signal conductor.

One conductor of the at least one signal conductor or the first ground conductor may include a first conductor portion and a second conductor portion. The first conductor portion may have a direct-current resistance value that is smaller than that of the resistance reducing material. The second conductor portion may be composed of the resistance reducing material.

Where the at least one signal conductor includes the first conductor portion and the second conductor portion, the second conductor portion of the or each signal conductor may be arranged on a side closer to the first ground conductor (the other conductor) than the first conductor portion is. In this case, the transmission loss of the high frequency signal is reduced in the at least one signal conductor. Also, it is possible to connect an electronic component, a connector, a cable, a pin, or the like to the first conductor portion of the or each signal conductor, which has a lower direct-current (DC) resistance value. This improves the reliability of connection of the at least one signal conductor.

Where the first ground conductor includes the first conductor portion and the second conductor portion, the second conductor portion of the first ground conductor may be arranged on a side closer to the at least one signal conductor (the other conductor) than the first conductor portion. In this case, the transmission loss of the high frequency signal is reduced in the first ground conductor. Also, it is possible to ground the first conductor portion of the first ground conductor, which has a lower DC resistance value. This improves the reliability of connection of the first ground conductor.

The transmission line may further include a second ground conductor. The second ground conductor may extend along at least part of the or each at least one signal conductor. In this case, the first ground conductor may be arranged on one side relative to the at least one signal conductor, and the second ground conductor may be arranged on the other side relative to the at least one signal conductor.

The or each signal conductor may further include a third conductor portion composed of the resistance reducing material. The second conductor portion of the or each signal conductor may be arranged on a side closer to the first ground conductor than the first conductor portion of the corresponding signal conductor is, and the third conductor portion of the or each signal conductor may be arranged on a side closer to the second ground conductor than the first conductor portion of the corresponding signal conductor is. Also in this case, the transmission loss of the high frequency signal is reduced in the at least one signal conductor.

The second ground conductor may further include a first conductor and a second conductor portion. The conductor portion may have a direct-current resistance value that is smaller than that of the resistance reducing material. The second conductor portion may be composed of the resistance reducing material. The second conductor portion of the second ground conductor may be arranged on a side closer to the at least one signal conductor than the first conductor portion of the second ground conductor is. In this case, the transmission loss of the high frequency signal is reduced in the second ground conductor. Also, it is possible to ground the first conductor portion of the second ground conductor, which has a lower DC resistance value. This improves the reliability of connection of the second ground conductor.

The or each second conductor portion of any of the above aspects may be fixed to at least part of the corresponding first conductor portion. The third conductor portion of the or each signal conductor may be fixed to at least part of the first conductor portion of the corresponding signal conductor.

The first ground conductor may be generally ring-shaped in a cross-sectional view in an orthogonal direction orthogonal to a length direction of the first ground conductor, and may surround the at least one signal conductor. In this case, the second conductor portion of the or each signal conductor may be generally ring-shaped in a cross-sectional view in the orthogonal direction, and may be provided on an outer perimeter face of at least part of the first conductor portion of the corresponding signal conductor.

The first conductor portion of the first ground conductor may be generally ring-shaped in a cross-sectional view in an orthogonal direction orthogonal to a length direction of the first ground conductor, and may surround the at least one signal conductor. In this case, the second conductor portion of the first ground conductor may be generally ring-shaped in a cross-sectional view in the orthogonal direction, and may be provided on an inner perimeter face of at least part of the first conductor portion of the first ground conductor.

The first conductor portion of the or each signal conductor may include a connecting portion not covered by the second conductor portion of the corresponding signal conductor. The connecting portion may be configured to be elastically or slidingly contacted by a connection target. In this case, the connecting portion of the first conductor portion of the or each signal conductor is elastically or slidingly contacted by a connection target. Since the connecting portion of the first conductor portion of the or each signal conductor is not covered by the second conductor portion as described above, it is possible to prevent wear or damage to the second conductor portion composed of the resistance reducing material. Alternatively, the connecting portion may be elastically contactable with a connection target. In this case, it is possible to prevent wear or damage to the second conductor portion composed of the resistance reducing material when the connecting portion makes elastic contact with the connection target.

The at least one signal conductor may be provided as a pair of signal conductors including a first signal conductor and a second signal conductor arranged side-by-side. In this case, it is optional whether or not to omit the first ground conductor and/or the second ground conductor.

At least one conductor of the first signal conductor and the second signal conductor may further include a fourth conductor portion composed of the resistance reducing material. Alternatively, at least one conductor of the first signal conductor or the second signal conductor may not include the second conductor portion but include the first conductor portion and the fourth conductor portion.

Where the first signal conductor includes the first conductor portion and the fourth conductor portion, the fourth conductor portion of the first signal conductor may be arranged on a side closer to the second signal conductor than the first conductor portion of the first signal conductor is. In this case, the transmission loss of the high frequency signal is reduced in the first signal conductor. Also, it is possible to connect an electronic component, a connector, a cable, a pin, or the like to the first conductor portion of the first signal conductor, which has a lower direct-current (DC) resistance value. This improves the reliability of connection of the first signal conductor.

Where the second signal conductor includes the first conductor portion and the fourth conductor portion, the fourth conductor portion of the second signal conductor may be arranged on a side closer to the first signal conductor side than the first conductor portion of the second signal conductor is. In this case, the transmission loss of the high frequency signal is reduced in the second signal conductor. Also, it is possible to connect an electronic component, a connector, a cable, a pin, or the like to the first conductor portion of the second signal conductor, which has a lower direct-current (DC) resistance value. This improves the reliability of connection of the second signal conductor.

The or each fourth conductor portion of any of the above aspects may be fixed to at least part of the corresponding first conductor portion.

A high frequency signal transmission method according to an aspect of the invention includes transmitting a high frequency signal through the transmission line of the high frequency transmission device of any of the above aspects, the high frequency signal having frequencies within the one or more specific frequency bands. The transmission of the high frequency signal includes that the AC resistance value of the resistance reducing material of the transmission line drops sharply; and/or that a direction of an induced electromotive force (counter-electromotive force) generated in a central portion of the resistance reducing material is reversed, the induced electromotive force being generated due to a magnetic field generated due to the high frequency signal.

BRIEF DESCRIPTION OF DRAWINGS

FIG. 8A is a schematic cross-sectional view of a first variant of the high frequency transmission device of the fifth embodiment.

FIG. 8B is a schematic cross-sectional view of a second variant of the high frequency transmission device of the fifth embodiment.

FIG. 9 is a diagram explaining a structure in which two high frequency transmission devices of the invention are connected together.

DESCRIPTION OF EMBODIMENTS

Various embodiments of the invention will now be described.

First Embodiment

Figure 1A:
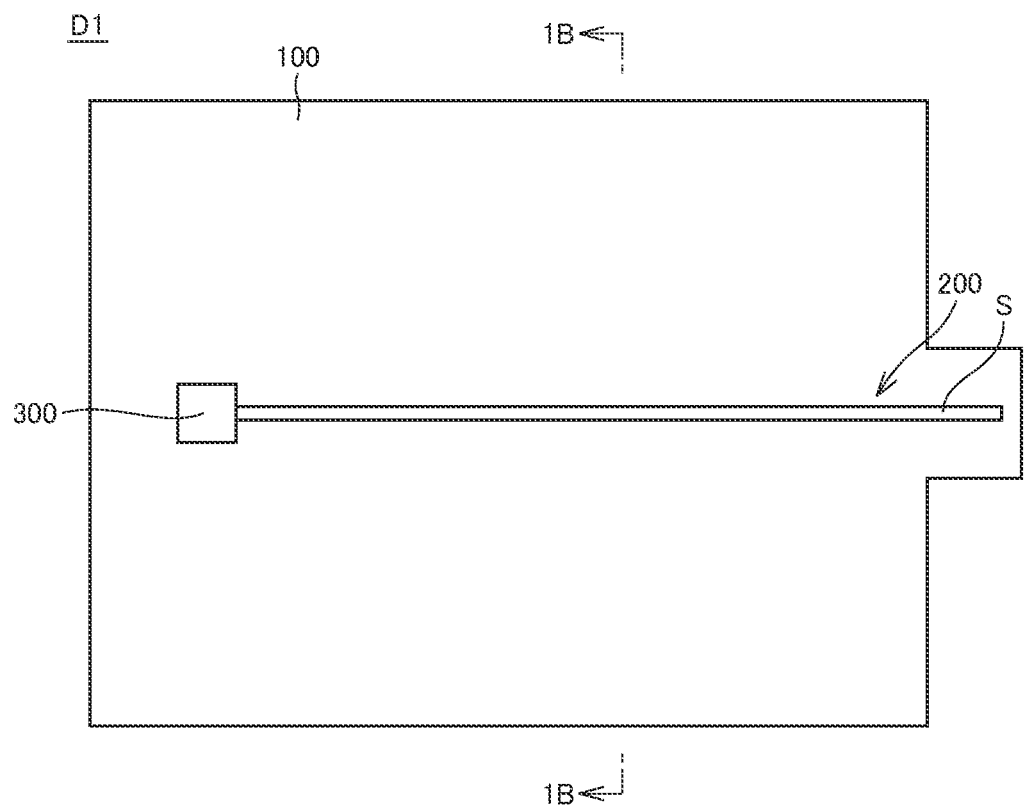
FIG. 1A is a schematic plan view of a high frequency transmission device according to a first embodiment of the invention.
Figure 1B:
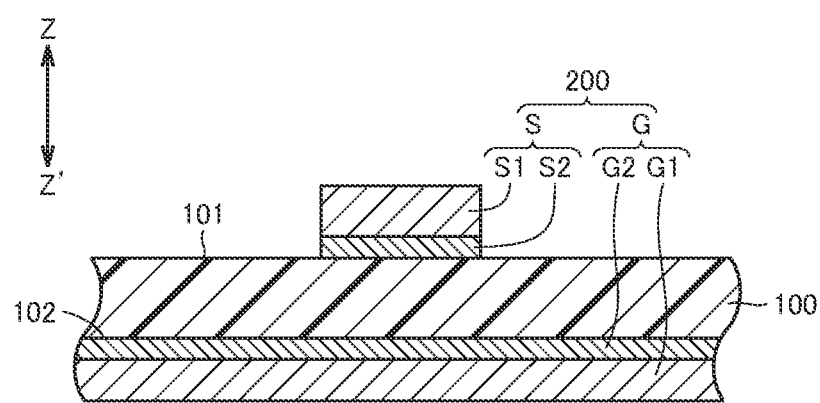
FIG. 1B is a partial cross-sectional view of the high frequency transmission device, taken along line 1B-1B in FIG. 1A.

The following is a description of a high frequency transmission device D1 according to a plurality of embodiments, including the first embodiment, of the invention with reference to FIGS. 1A and 1B. The high frequency transmission device D1 is a circuit board for high-frequency transmission. The high frequency transmission device D1 may also be referred to as a transmission board D1. FIGS. 1A and 1B show the transmission board D1 of the first embodiment.

The transmission board D1 includes a dielectric 100. FIG. 1B shows a Z-Z' direction being the thickness direction of the dielectric 100, and the Z-Z' direction includes a Z direction and a Z' direction opposite thereto. The dielectric 100 has a first face 101 on the Z-direction side and a second face 102 on the Z'-direction side.

The transmission board D1 further includes a transmission line 200 adapted for transmitting therethrough high frequency signals. The transmission line 200 includes a signal conductor S and a ground conductor G (first ground conductor). The transmission line 200 is located on the dielectric 100 as follows. The signal conductor S is provided on the first face 101 of the dielectric 100 and extends on the first face 101, from a first position to a second position different from the first position. The ground conductor G is provided on the second face 102 of the dielectric 100, extends along the signal conductor S, and faces the signal conductor S across the dielectric 100 in the Z-Z' direction. The signal conductor S and the ground conductor G constitute a microstrip line adapted for transmitting therethrough high frequency signals.

Part or the whole of the signal conductor S may be composed of a polycrystal (resistance reducing material). In this case, it is preferable that part or the whole of the ground conductor G be composed of the polycrystal, or alternatively the whole of the ground conductor G be composed of a conductor that does not contain the polycrystal. Alternatively, the whole of the signal conductor S may be composed of a conductor that does not contain the polycrystal. In this case, part or the whole of the ground conductor G may preferably be composed of the polycrystal.

This polycrystal is composed of conductor fine particles. The conductor fine particles are conductor nanoparticles having an average particle size from several nanometers to ten-odd nanometers, which may be e.g., iron nanoparticles, metal grade silicon nanoparticles, copper nanoparticles, nickel nanoparticles, and the like. The conductor nanoparticles can be obtained by the following method: placing high-purity conductor oxide fine powder, which is a raw material for conductor nanoparticles, in a solvent; and conducting laser ablation in liquid on the oxide conductor fine powder to reduce and convert the oxide conductor fine powder into nanoparticles.

It should be noted that the conductor nanoparticles can also be produced by a well-known liquid method other than the laser ablation in liquid method described above, or by a well-known vapor method. The liquid phase methods include coprecipitation methods, sol-gel methods, liquid phase reduction methods, hydrothermal synthesis methods, and the like. The vapor phase methods include electric furnace methods, chemical flame methods, laser methods, thermal plasma methods, and the like.

The conductor nanoparticles obtained by one of the above methods are mixed into a binder to make a paste. The conductive paste containing the conductor nanoparticles as the main component is sintered. The sintering removes the binder, so that the polycrystal is composed of conductor nanoparticles.

The polycrystal may preferably, but is not required to, have a physical property that where a high frequency signal to be transmitted through the transmission line 200 is of frequencies within one or more specific frequency bands that are in a MHz to GHz band (e.g., a frequency band around 1 MHz to around 20 GHz), an alternating current (AC) resistance value of the polycrystal drops sharply. This physical property of the polycrystal may appear even in a case where a high frequency signal to be transmitted through the transmission line 200 is of frequencies within one or more specific frequency bands that are in a frequency band or bands of THz or higher. The physical property of this polycrystal does not occur by superconductivity phenomenon, but occurs at ambient temperature. More specifically, the physical property of the polycrystal appears as follows.

Where a high frequency signal (high frequency current) to flow through the polycrystal at ambient temperature is of frequencies in a frequency band other than the above-described one or more specific frequency bands, the high frequency signal causes generation of a magnetic field, and the magnetic field causes generation of an induced electromotive force (counter-electromotive force) in a central portion of the polycrystal, in a direction obstructing the flow of the high frequency signal. In this case, the real part of the magnetic permeability of the polycrystal is positive. On the other hand, the direction of the induced electromotive force (counter-electromotive force) generated in a central portion of the polycrystal is reversed in a case where a high frequency signal to flow through the polycrystal is of frequencies in the above-described one or more specific frequency bands, the induced electromotive force being generated due to a magnetic field generated due to the high frequency signal. In this case, the real part of the magnetic permeability of the polycrystal is negative. Thus, the induced electromotive force (counter-electromotive force) generated in the central portion of the polycrystal is opposite in direction to the direction obstructing the flow of the high frequency signal, and therefore acts to facilitate the flow of the high frequency signal. As such, where a high frequency signal to flow through the polycrystal is of frequencies in the above-described one or more specific frequency bands, the AC resistance value of the polycrystal drops sharply, as compared with the case where a high frequency signal to flow through the polycrystal is of frequencies outside the above-described one or more specific frequency bands, and becomes substantially 0Ω or negative value. The one or more specific frequency bands of the high frequency signal are considered to be such frequency bands that magnetic resonance occurs in the polycrystal by the action of the magnetic field generated by the high frequency signal.

It should be noted that the polycrystal has a direct current (DC) resistance value that is higher than that of the pre-polycrystallization raw material (i.e., the raw material for the conductor nanoparticles). The time during transmission through the transmission line 200 of a high frequency signal within the one or more specific frequency bands will be referred to as "during transmission of a high frequency signal".

Where part of at least one conductor of the signal conductor S or the ground conductor G is composed of the polycrystal, the at least one conductor may include a first conductor portion, and a second conductor portion composed of the polycrystal.

The first conductor portion is composed of at least one of the following materials: a material having a DC resistance value that is smaller than that of the polycrystal (second conductor portion), or an anti-oxidant material or other anti-corrosive material. The first conductor portion may preferably be composed of, e.g., copper plating, copper foil, or the like. It is preferable to determine the DC resistance value of the first conductor portion as appropriate according to the length and cross-sectional area of the first conductor portion.

For convenience of description, the first conductor portion of the signal conductor S will be denoted by a reference numeral S1, the second conductor portion of the signal conductor S will be denoted by a reference numeral S2, the first conductor portion of the ground conductor G will be denoted by a reference numeral G1, and the second conductor portion of the ground conductor G will be denoted by a reference numeral G2, to make the distinguishable from each other.

During transmission of a high frequency signal, due to the skin effect, the high frequency signal has a higher current density in a portion of the signal conductor S that is closer to the ground conductor G (portion of the signal conductor S that is electrically coupled more strongly to the ground conductor G) and in a portion of the ground conductor G that is closer to the signal conductor S (portion of the ground conductor G that is electrically coupled more strongly to the signal conductor S).

Where the signal conductor S includes the first conductor portion S1 and the second conductor portion S2, the first conductor portion S1 and the second conductor portion S2 may be further configured as follows. The second conductor portion S2 may preferably be provided on the first face 101 of the dielectric 100 and extend from the first position to the second position, but may be discontinuous at one or more places. The first conductor portion S1 is provided on a face on the Z-direction side of the second conductor portion S2 and extends from the first position to the second position in a plan view in the Z direction. The second conductor portion S2 is thus fixed to at least part of the face on the Z'-direction side of the first conductor portion S1, and located closer to the ground conductor G than the first conductor portion S1 is. In other words, the second conductor portion S2 constitutes the portion of the signal conductor S that is electrically coupled more strongly to the ground conductor G (portion with a higher current density of a high frequency signal) during transmission of the high frequency signal. The first conductor portion S1 includes a first connecting portion at the first position and a second connecting portion at the second position.

Where the ground conductor G includes the first conductor portion G1 and the second conductor portion G2, the first conductor portion G1 and the second conductor portion G2 may be further configured as follows. The second conductor portion G2 is provided on the second face 102 of the dielectric 100 and extends along the signal conductor S. The second conductor portion G2 may be cut away at one or more places. The first conductor portion G1 is provided on a face on the Z'-direction side of the second conductor portion G2. The second conductor portion G2 is thus fixed to at least part of the face on the Z-direction side of the first conductor portion G1, and located closer to the signal conductor S than the first conductor portion G1 is. In other words, the second conductor portion G2 constitutes the portion of the ground conductor G that is electrically coupled more strongly to the signal conductor S (portion with a higher current density of a high frequency signal) during transmission of the high frequency signal.

The transmission board D1 may further include a transmitter 300. The transmitter 300 is achieved by a logic circuit, such as an integrated circuit (IC) adapted for transmission of a high frequency signal to the transmission line 200, or software to processed by a processor. The transmitter 300 is mounted at the first position of the first face 101 of the dielectric 100 and electrically and mechanically connected to the signal conductor S. Where the signal conductor S includes the first conductor portion S1, the transmitter 300 is electrically and mechanically connected to the first connecting portion of the first conductor portion S1. For example, the transmitter 300 is soldered to the first conductor portion S1 or to the first connecting portion of the first conductor portion S1. The transmitter 300 can be omitted. In this case, the signal conductor S, or the first conductor portion S1 of the signal conductor S, may preferably be connected to a connector or a connecting means, such as a cable or a pin, in order to electrically connect the transmission board D1 mounted on an electronic apparatus to a transmitter of the electronic apparatus.

A connector, connecting means such as a cable or a pin, or an electronic component, such as a receiving unit to receive a high frequency signal, may preferably be connectable to a portion at the second position of the signal conductor S.

Where the signal conductor S includes the first conductor portion S1, the connector, the connecting means, or the electronic component may be electrically and mechanically connected to the second connecting portion (i.e., the portion at the second position) of the first conductor portion S1.

It should be noted that the first and second connecting portions of the first conductor portion S1 are not covered in the Z direction by the second conductor portion S2. At least one connecting portion of the first and second connecting portions of the first conductor portion S1 corresponds to the connecting portion of the first conductor portion of the signal conductor recited in the claims. Where the face on the Z-direction side of the at least one connecting portion is to be elastically or slidingly contacted by a connector terminal (connection target), it is possible to prevent wear or damage to the second conductor portion S2 due to elastic or sliding contact of the connector terminal because the second conductor portion S2 is not provided on the face on the Z-direction side of the at least one connecting portion.

A method for manufacturing the above transmission board D1 will now be described. The dielectric 100 is prepared. Thereafter, the signal conductor S, or alternatively the part of the signal conductor S, is formed on the first face 101 of the dielectric 100 in one of the following manners (1) to (3), and the ground conductor G, or alternatively the part of the ground conductor G, is formed on the second face 102 of the dielectric 100 in one of the following manners (4) to (6).

(1) Where the signal conductor S is composed only of the polycrystal, the conductive paste containing conductor nanoparticles as the main component is prepared as described above, and printing in the conductive paste is done on the first face 101 of the dielectric 100 by a well-known printing method (for example, a screen-printing method, an inkjet-printing method, or a spray-printing method).

(2) Where the signal conductor S includes the first conductor portion S1 and the second conductor portion S2, the conductive paste containing conductor nanoparticles as the main component is prepared as described above, and printing in the conductive paste is done on the first face 101 of the dielectric 100 by the above well-known printing method.

(3) Where the signal conductor S does not contain the polycrystal, printing in the conductor that does not contain the polycrystal is done on the first face 101 of the dielectric 100 by the above well-known printing method.

(4) Where the ground conductor G is composed only of the polycrystal, the conductive paste containing conductor nanoparticles as the main component is prepared as described above, and printing in the conductive paste is done on the second face 102 of the dielectric 100 by the above well-known printing method.

(5) Where the ground conductor G includes the first conductor portion G1 and the second conductor portion G2, the conductive paste containing conductor nanoparticles as the main component is prepared as described above, and printing in the conductive paste is done on the second face 102 of the dielectric 100 by the above well-known printing method described above.

(6) Where the ground conductor G does not contain the polycrystal, printing in the conductor that does not contain the polycrystal is done on the second face 102 of the dielectric 100 by the above well-known printing method.

Thereafter, the dielectric 100 with the part or whole of the signal conductor S and the part or whole of the ground conductor G is placed into an electric oven or other electric cooker, or an electric furnace, and heated at a low temperature (e.g., 250° C.) under atmospheric pressure for several minutes to several tens of minutes to sinter the conductive paste. In case (1) above, the sintered conductive paste becomes the polycrystal (signal conductor S). In case (2) above, the sintered conductive paste becomes the polycrystal (second conductor portion S2). In case (4) above, the sintered conductive paste becomes the polycrystal (ground conductor G). In case (5) above, the sintered conductive paste becomes the polycrystal (second conductor portion G2). It should be noted that the sintering time may be modified as desired according to the type of binder or other factors.

In case (2) above, printing in the conductor to form the first conductor portion S1 is done on the sintered second conductor portion S2 by the above well-known printing method. In case (5) above, printing in the conductor to form the first conductor portion G1 is done on the sintered second conductor portion G2 by the above well-known printing method. Thus the signal conductor S of one of the above aspects and the ground conductor G of one of the above aspects are formed on the dielectric 100. Where the transmission board D1 includes the transmitter 300, the transmitter 300 is mounted on the first face 101 of the dielectric 100 and electrically and mechanically connected to the signal conductor S. The transmission board D1 is thus manufactured.

The transmission board D1 described above provides the following technical features and effects.

(A) When a high frequency signal to be transmitted through the transmission line 200 is of frequencies within the one or more specific frequency bands, the transmission loss (attenuation) of the high frequency signal is reduced for the following reasons.

Where a high frequency signal to be transmitted is of frequencies within the one or more specific frequency bands, the AC resistance value of the polycrystal forming at least the part of the at least one conductor of the signal conductor S or the ground conductor G of the transmission line 200 drops sharply. This reduces the transmission loss of the high frequency signal.

Also, where the signal conductor S includes the second conductor portion S2 composed of the polycrystal, the second conductor portion S2 constitutes the portion of the signal conductor S with a higher current density of a high frequency signal during transmission of the high frequency signal (constitute the portion of the signal conductor S closer to the ground conductor G). Where a high frequency signal to be transmitted is of frequencies within the one or more specific frequency bands, the AC resistance value of the second conductor portion S2 drops sharply. This reduces the transmission loss of the high frequency signal in the signal conductor S. Where the ground conductor G includes the second conductor portion G2 composed of the polycrystal, the second conductor portion G2 constitutes the portion of the ground conductor G with a higher current density of a high frequency signal during transmission of the high frequency signal (constitute the portion of the ground conductor G closer to the signal conductor S). Where a high frequency signal to be transmitted is of frequencies within the one or more specific frequency bands, the AC resistance value of the second conductor portion G2 drops sharply. This reduces the transmission loss of the high frequency signal in the ground conductor G.

(B) Where the signal conductor S includes the first conductor portion S1 and the second conductor portion S2, it is possible to improve the reliability of connection of the signal conductor S to the transmitter 300 of the transmission board D1, the above connector, the above electronic component, or the above connecting means for the following reasons.

The first conductor portion S1 is composed of at least one of the following materials: a material having a DC resistance value that is smaller than that of the polycrystal, or an anti-oxidant material or other anti-corrosive material. As such, the first conductor portion S1 is electrically and mechanically connectable with the transmitter 300, the connector, the electronic component, or the connecting means. This improves the reliability of connection of the transmitter 300 or the connector, the electronic component, or the connecting means to the transmission board D1.

Where the ground conductor G includes the first conductor portion G1 and the second conductor portion G2, it is possible to improve the reliability of connection of the transmission board D1 with respect to grounding for the following reasons.

The first conductor portion G1 is composed of at least one of the following materials: a material having a DC resistance value that is smaller than that of the polycrystal, or an anti-oxidant material or other anti-corrosive material. Such first conductor portion G1 is connectable to a ground, resulting in improved reliability of connection of the transmission board D1 with respect to grounding.

Second Embodiment

Figure 2A:
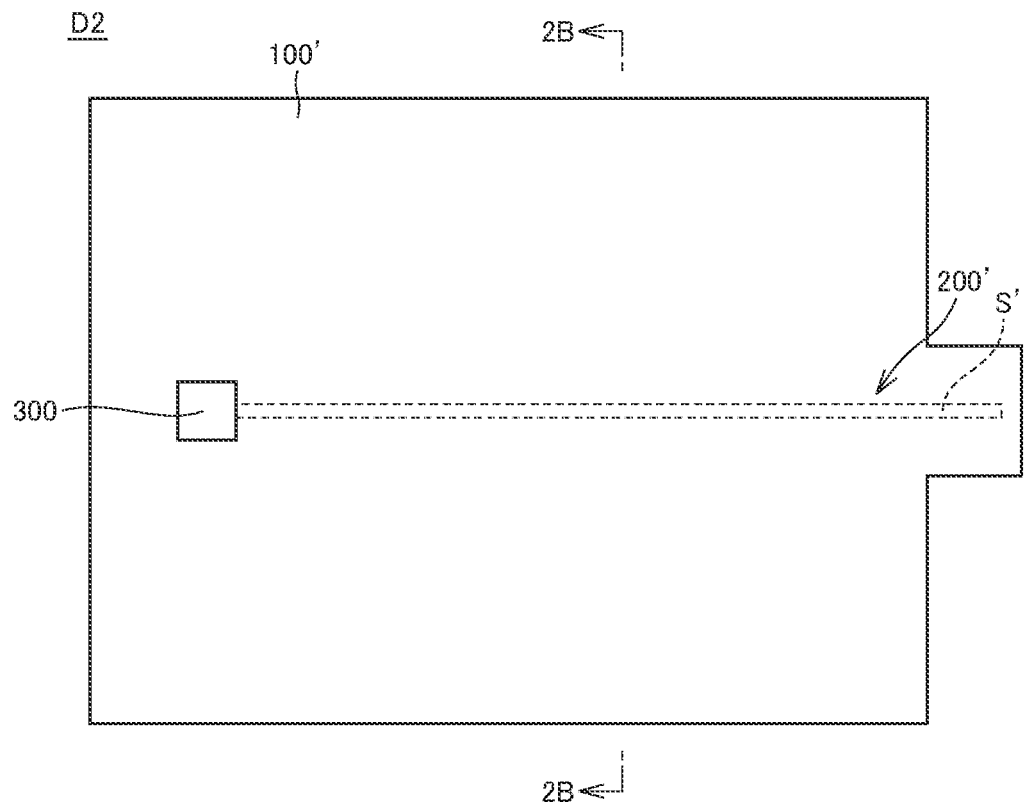
FIG. 2A is a schematic plan view of a high frequency transmission device according to a second embodiment of the invention.
Figure 2B:
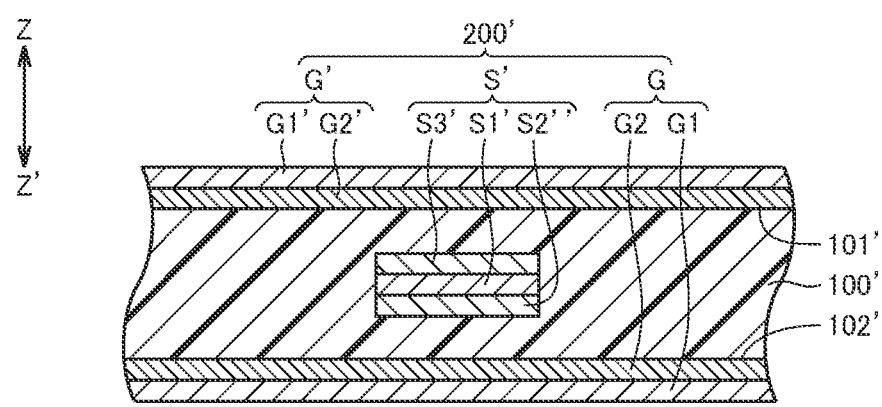
FIG. 2B is a partial cross-sectional view of the high frequency transmission device, taken along line 2B-2B in FIG. 2A.

The following is a description of a high frequency transmission device D2 according to a plurality of embodiments, including the second embodiment, of the invention with reference to FIGS. 2A and 2B. The high frequency transmission device D2 is a circuit board for high-frequency transmission. The high frequency transmission device D2 may also be referred to as a transmission board D2. FIGS. 2A and 2B show the transmission board D2 of the second embodiment. The transmission board D2 is similar in configuration to the transmission board D1, but is different in that a transmission line 200' includes a ground conductor G' (second ground conductor) in addition to the signal conductor S' and the ground conductor G (first ground conductor), and the signal conductor S' is provided inside the dielectric 100'. The differences will be described in detail, omitting description of overlaps with the transmission board D1. FIG. 2B also indicates the Z-Z' direction.

The dielectric 100' of the transmission board D2 is a multilayer circuit board, and has a first face 101' on the Z-direction side and a second face 102' on the Z'-direction side. For convenience of description, the portion of the dielectric 100' that is on the Z-direction side relative to the signal conductor S' will be referred to as an upper layer portion, and the portion of the dielectric 100' that is on the Z'-direction side relative to the signal conductor S' of the dielectric 100' will be referred to as a lower layer portion.

The signal conductor S', the ground conductor G, and the ground conductor G' of the transmission line 200' of the transmission board D2 constitute a strip line adapted for transmitting therethrough high frequency signals. The time during transmission through the transmission line 200' of a high frequency signal within the one or more specific frequency bands will be referred to as "during transmission of a high frequency signal". The transmission line 200' is located on and inside the dielectric 100' as described below. The signal conductor S' is provided inside the dielectric 100' and extends in the inside from a first position to a second position different from the first position. The ground conductor G is provided on the second face 102' of the dielectric 100', extends along the signal conductor S', and is arranged on the Z'-direction side (one side) relative to the signal conductor S', across the lower layer portion of the dielectric 100'. The ground conductor G' is provided on the first face 101' of the dielectric 100', extends along the signal conductor S', and is arranged on the Z-direction side (the other side) relative to the signal conductor S', across the upper layer portion of the dielectric 100'.

Part or the whole of the signal conductor S' may be composed of the above polycrystal. In this case, the ground conductor G and the ground conductor G' may have one of the following configurations (I) to (III).

(I) Part or the whole of the ground conductor G and part or the whole of the ground conductor G' are composed of the polycrystal.

(II) Part or the whole of the ground conductor G is composed of the polycrystal, and the whole of the ground conductor G' is composed of the conductor that does not contain the polycrystal. Alternatively, the converse may be adopted.

(III) The whole of the ground conductor G and the whole of the ground conductor G' are composed of conductors that do not contain the polycrystal.

Alternatively, the whole of the signal conductor S' may be composed of the conductor that does not contain the polycrystal. In this case, the ground conductor G and the ground conductor G' may have either of the following configurations (IV) or (V).

(IV) Part or the whole of ground conductor G and part or the whole of the ground conductor G' are composed of the polycrystal.

(V) Part or the whole of the ground conductor G is composed of the polycrystal, and the whole of the ground conductor G' is composed of a conductor that does not contain the polycrystal. Alternatively, the converse may be adopted.

During transmission of a high frequency signal, due to the skin effect, the high frequency signal has a higher current density in a portion of the signal conductor S' that is closer to the ground conductor G (portion of the signal conductor S' that is electrically coupled more strongly to the ground conductor G), in a portion of the signal conductor S' that is closer to the ground conductor G' (portion of the signal conductor S' that is electrically coupled more strongly to the ground conductor G'), in a portion of the ground conductor G that is closer to the signal conductor S' (portion of the ground conductor G that is electrically coupled more strongly to the signal conductor S'), and in a portion of the ground conductor G' that is closer to the signal conductor S' (portion of the ground conductor G' that is electrically coupled more strongly to the signal conductor S').

Where part of the signal conductor S' is composed of the polycrystal, the signal conductor S' may include a first conductor portion S1' and a second conductor portion S2'; or alternatively a first conductor portion S1' and a third conductor portion S3'; or alternatively a first conductor portion S1', a second conductor portion S2', and a third conductor portion S3'.

The first conductor portion S1' and the second conductor portion S2' are similar in configuration to the first conductor portion S1 and the second conductor portion S2, respectively, of the signal conductor S of the transmission board D1, but different in the following points. The first conductor portion S1' extends inside the dielectric 100', from a first position to a second position in a plan view in the Z direction.

The second conductor portion S2' may preferably be provided on the face on the Z'-direction side of the first conductor portion S1' and extend inside the dielectric 100', from the first position to the second position in a plan view in the Z direction, but may be discontinuous at one or more places. In other words, the second conductor portion S2' is fixed to at least part of the face on the Z'-direction side of the first conductor portion S1', and located closer to the ground conductor G than the first conductor portion S1' is.

The third conductor portion S3' may preferably be composed of the polycrystal, be provided on the face on the Z-direction side of the first conductor portion S1', and extend inside the dielectric 100', from the first position to the second position in a plan view in the Z direction, but may be discontinuous at one or more places. In other words, the third conductor portion S3' is fixed to at least part of the face on the Z-direction side of the first conductor portion S1', and located closer to the ground conductor G' than the first conductor portion S1' is.

It should be appreciated that since the transmission line 200' is provided inside the dielectric 100' as described above, the above phrase "in a plan view in the Z direction" does not mean that an object is actually visible to a viewer from the Z-direction side of the transmission board D2.

It should be noted that the first connecting portion at the first position and the second connecting portion on the second position of the first conductor portion S1' are not provided with either of, or one of, the second conductor portion S2' or the third conductor portion S3'.

Where part of the ground conductor G is composed of the polycrystal, the ground conductor G may include a first conductor portion G1 and a second conductor portion G2. The first conductor portion G1 and the second conductor portion G2 are similar in configuration to the first conductor portion G1 and the second conductor portion G2, respectively, of the ground conductor G of the transmission board D1.

Where part of the ground conductor G' is composed of the polycrystal, the ground conductor G' may include a first conductor portion G1' and a second conductor portion G2'. The second conductor portion G2' is similar in configuration to the second conductor portion G2, but different in that the second conductor portion G2' is provided on the first face 101' of the dielectric 100'. The first conductor portion G1' is similar in configuration to the first conductor portion G1, but different in that the first conductor portion G1' is provided on the face on the Z-direction side of the second conductor portion G2'. In other words, the second conductor portion G2' is fixed to at least part of the face on the Z'-direction side of the first conductor portion G1', and located closer to the signal conductor S' than the first conductor portion G1' is.

Where the transmission board D2 further includes a transmitter 300, the transmitter 300 is mounted on the first face 101' of the dielectric 100' and is electrically and mechanically connected to the portion at the first position of the signal conductor S'. Where the signal conductor S' includes the first conductor portion S1', the transmitter 300 is electrically and mechanically connected to the first connecting portion of the first conductor portion S1'. The transmitter 300 can be omitted as with that of the transmission board D1.

A method for manufacturing the above transmission board D2 will now be described. The lower layer portion of the dielectric 100' is prepared. After that, the signal conductor S' is formed on the face on the Z-direction side of the lower layer portion of the dielectric 100' in one of manners (1) to (3) described above or a manner (7) described below, and the ground conductor G is formed on the second face 102' of the lower layer portion of the dielectric 100' in one of manners (4) to (6) described above.

(7) Where the signal conductor S' includes the first conductor portion S1' and the third conductor portion S3', the conductive paste containing conductor nanoparticles as the main component is prepared as described above, and printing in the conductor to form the first conductor portion S1' is done on the face on the Z-direction side of the lower layer portion of the dielectric 100' by the above well-known printing method, and printing in the conductive paste is done on the first conductor portion S1' by the above well-known printing method.

After that, the lower layer portion of the dielectric 100' with the part or whole of the signal conductor S', obtained in one of steps (1) to (3) and (7), and with the part or whole of the ground conductor G, obtained in one of steps (4) to (6), is placed into the electric cooker or electric furnace to sinter the conductive paste as described above. In case (1) above, the sintered conductive paste becomes the polycrystal (signal conductor S'). In case (2) above, the sintered conductive paste becomes the polycrystal (second conductor portion S2'). In case (7) above, the sintered conductive paste becomes the polycrystal (third conductor portion S3'). In case (4) above, the sintered conductive paste becomes the polycrystal (ground conductor G). In case (5) above, the sintered conductive paste becomes the polycrystal (second conductor portion G2).

In case (2) above, printing in the conductor to form the first conductor portion S1' is done on the sintered conductive paste (second conductor portion S2') by the above well-known printing method. Where the signal conductor S' includes the third conductor portion S3' in case (2) above, the conductive paste containing conductor nanoparticles as the main component is prepared as described above, printing in the conductive paste is done on the first conductor portion S1' by the above well-known printing method, and the conductive paste is sintered as described above. The sintered conductive paste becomes the polycrystal (third conductor portion S3'). In case (5) above, printing in the conductor to form the first conductor portion G1 is done on the sintered second conductor portion G2 by the above well-known printing method.

After that, the upper layer portion is formed on the lower layer portion of the dielectric 100'. The signal conductor S' is thus placed inside the dielectric 100'. After that, the ground conductor G', or alternatively the part of the ground conductor G', is formed on the first face 101' of the dielectric 100' in one of the following manners (8) to (10).

(8) Where the ground conductor G' is composed only of the polycrystal, the conductive paste containing conductor nanoparticles as the main component is prepared as described above, and printing in the conductive paste is done on the first face 101' of the dielectric 100' by the above well-known printing method.

(9) Where the ground conductor G' includes the first conductor portion G1' and the second conductor portion G2', the conductive paste containing conductor nanoparticles as the main component is prepared as described above, and printing in the conductive paste is done on the first face 101' of the dielectric 100' by the above well-known printing method.

(10) Where the ground conductor G' does not contain the polycrystal, printing in the conductor that does not contain the polycrystal is done on the first face 101' of the dielectric 100' by the above well-known printing method.

After step (8) or (9), the dielectric 100' with the part or whole of the ground conductor G' is placed into the electric cooker or electric furnace to sinter the conductive paste. In case (8) above, the sintered conductive paste becomes the polycrystal (ground conductor G'). In case (9) above, the sintered conductive paste becomes the polycrystal (second conductor portion G2'). Printing in the conductor to form the first conductor portion G1' is done on the sintered second conductor portion G2' by the above well-known printing method. Thus the signal conductor S', the ground conductor G, and the ground conductor G' of any of the above aspects are formed at the dielectric 100'. Where the transmission board D2 includes the transmitter 300, the transmitter 300 is mounted on the first face 101' of the dielectric 100' and electrically and mechanically connected to the signal conductor S'. The transmission board D2 is thus manufactured.

The transmission board D2 described above reduces the transmission loss (attenuation) of a high frequency signal to be transmitted through the transmission line 200' in a case where the high frequency signal is of frequencies within the one or more specific frequency bands for the following reasons.

Where a high frequency signal to be transmitted is of frequencies within the one or more specific frequency bands, the AC resistance value of the polycrystal forming at least the part of at least one conductor of the signal conductor S', the ground conductor G, or the ground conductor G' of the transmission line 200' drops sharply. This reduces the transmission loss of the high frequency signal.

Also, where the signal conductor S' includes the second conductor portion S2' composed of the polycrystal and/or the third conductor portion S3' composed of the polycrystal, the second conductor portion S2' and/or the third conductor portion S3' constitutes the portion(s) of the signal conductor S' with a higher current density of a high frequency signal during transmission of the high frequency signal (constitutes the portion of the signal conductor S' closer to the ground conductor G and/or the portion of the signal conductor S' closer to the ground conductor G'). Where a high frequency signal to be transmitted is of frequencies within the one or more specific frequency bands, the AC resistance value(s) of the second conductor portion S2' and/or the third conductor portion S3' drops sharply. This reduces the transmission loss of the high frequency signal in the signal conductor S'.

Where the ground conductor G includes the second conductor portion G2 composed of the polycrystal, the second conductor portion G2 constitutes the portion of the ground conductor G with a higher current density of a high frequency signal during transmission of the high frequency signal (constitute the portion of the ground conductor G closer to the signal conductor S'). Where a high frequency signal to be transmitted is of frequencies within the one or more specific frequency bands, the AC resistance value of the second conductor portion G2 drops sharply. This reduces the transmission loss of the high frequency signal in the ground conductor G.

Where the ground conductor G' includes the second conductor portion G2' composed of the polycrystal, the second conductor portion G2' constitutes the portion of the ground conductor G' with a higher current density of a high frequency signal during transmission of the high frequency signal (constitute the portion of the ground conductor G' closer to the signal conductor S'). Where a high frequency signal to be transmitted is of frequencies within the one or more specific frequency bands, the AC resistance value of the second conductor portion G2' drops sharply. This reduces the transmission loss of the high frequency signal in the ground conductor G'.

It should be noted that the transmission board D2 also provides the same technical features and effects as those of (B) above of the transmission board D1.

Third Embodiment

Figure 3A:
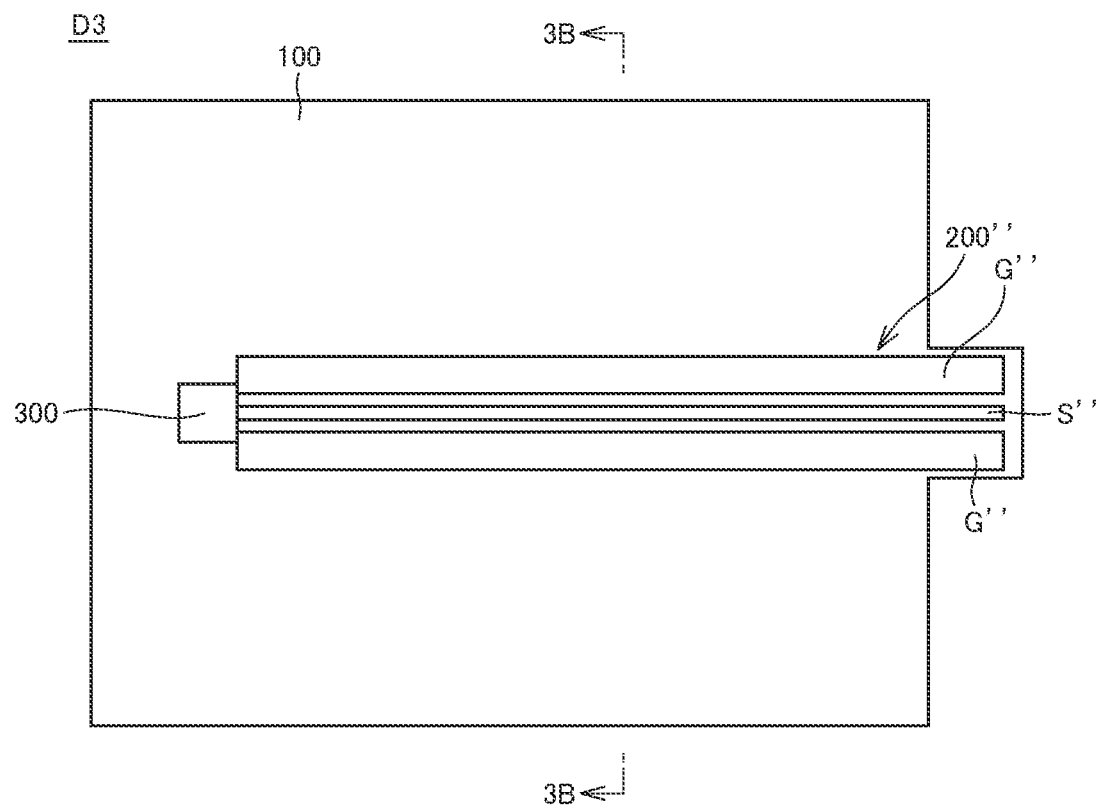
FIG. 3A is a schematic plan view of a high frequency transmission device according to a third embodiment of the invention.
Figure 3B:
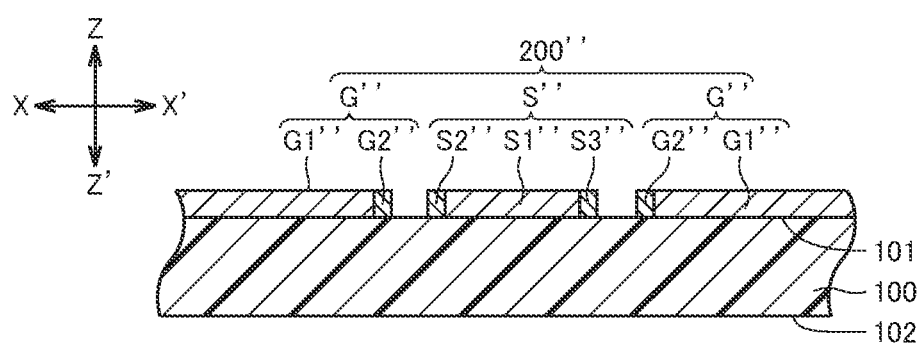
FIG. 3B is a partial cross-sectional view of the high frequency transmission device, taken along line 3B-3B in FIG. 3A.

The following is a description of a high frequency transmission device D3 according to a plurality of embodiments, including the third embodiment, of the invention with reference to FIGS. 3A and 3B. The high frequency transmission device D3 is a circuit board for high-frequency transmission. The high frequency transmission device D3 may also be referred to as a transmission board D3. FIGS. 3A and 3B show the transmission board D3 of the third embodiment. The transmission board D3 is similar in configuration to the transmission board D1, but is different in that a transmission line 200" includes a signal conductor S" and a pair of ground conductors G". The differences will be described in detail, omitting description of overlaps with the transmission board D1. FIG. 3B indicates, in addition to the Z-Z' direction, an X-X' direction being the transverse direction of the signal conductor S".

The signal conductor S" of the transmission line 200" and the pair of ground conductors G" form a coplanar line adapted for transmitting therethrough high frequency signals. The time during transmission through the transmission line 200" of a high frequency signal within the one or more specific frequency bands will be referred to as "during transmission of a high frequency signal". The transmission line 200" is located on the dielectric 100 as follows. The signal conductor S" is provided on the first face 101 of the dielectric 100 and extends from a first position to a second position. The pair of ground conductors G" includes a first ground conductor G" and a second ground conductor G". The first ground conductor G" is provided on the first face 101 of the dielectric 100, extends along the signal conductor S", and is arranged in spaced relation to, and on the X-direction side (one side) relative to, the signal conductor S". The second ground conductor G" is provided on the first face 101 of the dielectric 100, extends along the signal conductor S", and is arranged in spaced relation to, and on the X'-direction side (the other side) relative to, the signal conductor S".

Part or the whole of the signal conductor S" may be composed of the polycrystal. In this case, the first ground conductor G" and the second ground conductor G" may preferably have one of the following configurations (I) to (III).

(I) Part or the whole of the first ground conductor G" and part or the whole of the second ground conductor G" are composed of the polycrystal.

(II) Part or the whole of the first ground conductor G" is composed of the polycrystal, and the whole of the second ground conductor G" is composed of a conductor that does not contain the polycrystal. Alternatively, the converse may be adopted.

(III) The whole of the first ground conductor G" and the whole of the second ground conductor G" are composed of conductors that do not contain the polycrystal.

Alternatively, the whole of the signal conductor S" may be composed of a conductor that does not contain the polycrystal. In this case, the first ground conductor G" and the second ground conductor G" may have either of the following configurations (IV) or (V).

(IV) Part or the whole of the first ground conductor G" and part or the whole of the second ground conductor G" are composed of the polycrystal.

(V) Part or the whole of the first ground conductor G" is composed of the polycrystal, and the whole of the second ground conductor G" is composed of a conductor that does not contain the polycrystal. Alternatively, the converse may be adopted.

During transmission of a high frequency signal, due to the skin effect, the high frequency signal has a higher current density in a portion of the signal conductor S" that is closer to the first ground conductor G" (portion of the signal conductor S" that is electrically coupled more strongly to the first ground conductor G"), in a portion of the signal conductor S" that is closer to the second ground conductor G" (portion of the signal conductor S" that is electrically coupled more strongly to the second ground conductor G"), in a portion of the first ground conductor G" that is closer to the signal conductor S" (portion of the first ground conductor G" that is electrically coupled more strongly to the signal conductor S"), and in a portion of the second ground conductor G" that is closer to the signal conductor S" (portion of the second ground conductor G" that is electrically coupled more strongly to the signal conductor S").

Where part of the signal conductor S" is composed of the polycrystal, the signal conductor S" may include a first conductor portion S1" and a second conductor portion S2"; or alternatively a first conductor portion S1" and a third conductor portion S3"; or alternatively a first conductor portion S1", a second conductor portion S2", and a third conductor portion S3".

The first conductor portion S1" is similar in configuration to the first conductor portion S1 of the transmission board D1, but different in that the first conductor portion S1" is provided on the first face 101 of the dielectric 100 and extends from the first position to the second position.

The second conductor portion S2" is composed of the polycrystal. The second conductor portion S2" is provided on the first face 101 of the dielectric 100, is fixed to at least part of the face on the X-direction side of the first conductor portion S1", and is located closer to the first ground conductor G" than the first conductor portion S1" is. The second conductor portion S2" may preferably extend from the first position to the second position along the face on the X-direction side of the first conductor portion S1", but may be discontinuous at one or more places. In other words, the second conductor portion S2" constitutes the portion of the signal conductor S" that is electrically coupled more strongly to the first ground conductor G" (portion with a higher current density of a high frequency signal) during transmission of the high frequency signal.

The third conductor portion S3" is composed of the polycrystal. The third conductor portion S3" is provided on the first face 101 of the dielectric 100, is fixed to at least part of the face on the X'-direction side of the first conductor portion S1", and is located closer to the second ground conductor G" than the first conductor portion S1" is. The third conductor portion S3" may preferably extend from the first position to the second position along the face on the X'-direction side of the first conductor portion S1", but may be discontinuous at one or more places. In other words, the third conductor portion S3" constitutes the portion of the signal conductor S" that is electrically coupled more strongly to the second ground conductor G" (portion with a higher current density of a high frequency signal) during transmission of the high frequency signal.

It should be noted that the first and second connecting portions of the first conductor portion S1" are covered in the Z direction by neither the second conductor portion S2" nor the third conductor portion S3". Therefore, at least one connecting portion of the first and second connecting portions of the first conductor portion S1" corresponds to the connecting portion of the first conductor portion of the signal conductor recited in the claims. Where the face on the Z-direction side of the at least one connecting portion is to be elastically or slidingly contacted by a connector terminal (connection target), it is possible to prevent wear or damage to the second conductor portion S2 and the third conductor portion S3" due to elastic or sliding contact of the connector terminal because the second conductor portion S2" and the third conductor portion S3" are not provided on the face on the Z-direction side of the at least one connecting portion.

Where part of at least one conductor of the pair of ground conductors G" is composed of the polycrystal, the at least one conductor may include a first conductor portion G1" and a second conductor portion G2".

The first conductor portion G1" of the first ground conductor G" extends along the signal conductor S" on the first face 101 of the dielectric 100, and is arranged in spaced relation to, and on the X-direction side relative to the signal conductor S". The first conductor portion G1" of the second ground conductor G" extends along the signal conductor S" on the first face 101 of the dielectric 100, and is arranged in spaced relation to, and on the X'-direction side relative to the signal conductor S". The second conductor portion G2" of the first ground conductor G" is provided on the first face 101 of the dielectric 100, fixed to at least part of the face on the X'-direction side of the first conductor portion G1" of the first ground conductor G", and located closer to the signal conductor S" than the first conductor portion G1" is. The second conductor portion G2" of the second ground conductors G" is provided on the first face 101 of the dielectric 100, fixed to at least part of the face on the X-direction side of the first conductor portion G1" of the second ground conductor G", and located closer to the signal conductor S" than the first conductor portion G1" is. The second conductor portion G2" of the first ground conductor G" is arranged in spaced relation to, and on the X-direction side relative to the signal conductor S". The second conductor portion G2" of the second ground conductor G" is arranged in spaced relation to, and on the X'-direction side relative to the signal conductor S". The second conductor portion G2" of the first ground conductor G" may preferably extend from the first position to the second position along the face on the X'-direction side of the first conductor portion G1", but may be discontinuous at one or more places. In other words, the second conductor portion G2" of the first ground conductor G" constitute the portion of the first ground conductor G" that is electrically coupled more strongly to the signal conductor S" (portion with a higher current density of a high frequency signal) during transmission of the high frequency signal. The second conductor portion G2" of the second ground conductor G" may preferably extend from the first position to the second position along the face on the X-direction side of the first conductor portion G1", but may be discontinuous at one or more places. In other words, the second conductor portion G2" of the second ground conductor G" constitute the portion of the second ground conductor G" that is electrically coupled more strongly to the signal conductor S" (portion with a higher current density of the high frequency signal) during transmission of the high frequency signal.

A method for manufacturing the above transmission board D3 will now be described. The dielectric 100 is prepared. Thereafter, the signal conductor S" is formed on the first face 101 of the dielectric 100 in one of the following manners (1) to (5), and the ground conductors G" are formed on the second face 102 of the dielectric 100 in one of the following manners (6) to (8).

(1) Where the signal conductor S" is composed only of the polycrystal, the conductive paste containing conductor nanoparticles as the main component is prepared as described above, and printing in the conductive paste is done on the first face 101 of the dielectric 100 by a well-known printing method (for example, a screen-printing method, an inkjet-printing method, or a spray-printing method).

(2) Where the signal conductor S" includes the first conductor portion S1" and the second conductor portion S2", the conductive paste containing conductor nanoparticles as the main component is prepared as described above, printing in the conductor to form the first conductor portion S1" is done on the first face 101 of the dielectric 100 by the above well-known printing method, and printing in the conductive paste to form the second conductor portion S2" is done on the X-direction side relative to the first conductor portion S1" on the first face 101 of the dielectric 100, by the above well-known printing method.

(3) Where the signal conductor S" includes the first conductor portion S1" and the third conductor portion S3", the conductive paste containing conductor nanoparticles as the main component is prepared as described above, printing in the conductor to form the first conductor portion S1" is done on the first face 101 of the dielectric 100 by the above well-known printing method, and printing in the conductive paste to form the third conductor portion S3" is done on the X'-direction side relative to the first conductor portion S1" on the first face 101 of the dielectric 100 by the above well-known printing method.

(4) Where the signal conductor S" includes the first conductor portion S1", the second conductor portion S2", and the third conductor portion S3", the conductive paste containing conductor nanoparticles as the main component is prepared as described above, printing in the conductor to form the first conductor portion S1" is done on the first face 101 of the dielectric 100 by the above well-known printing method, printing in the conductive paste to form the second conductor portion S2" is done on the X-direction side relative to the first conductor portion S1" on the first face 101 of the dielectric 100 by the above well-known printing method, and printing in the conductive paste to form the third conductor portion S3" is done on the X'-direction side relative to the conductor on the first face 101 of the dielectric 100 by the above well-known printing method.

(5) Where the signal conductor S" does not contain the polycrystal, printing in the conductor that does not contain the polycrystal is done on the first face 101 of the dielectric 100 by the above well-known printing method.

(6) Where the first ground conductor G" and/or the second ground conductor G" is composed only of the polycrystal, the conductive paste containing conductor nanoparticles as the main component is prepared as described above, and printing in the conductive paste is done on the first face 101 of the dielectric 100 by the above well-known printing method described above.

(7) Where the first ground conductor G" and/or the second ground conductor G" includes the first conductor portion G1" and the second conductor portion G2", the conductive paste containing conductor nanoparticles as the main component is prepared as described above, printing in the conductor to form the first conductor portion(s) G1" is done on the first face 101 of the dielectric 100 by the above well-known printing method described above, and printing in the conductive paste to form the second conductor portion(s) G2" is done, on the X'- and/or X-direction side relative to the first conductor portion(s) G1", on the first face 101 of the dielectric 100 by the above well-known printing method described above.

(8) Where the first ground conductor G" and/or the second ground conductor G" does not contain the polycrystal, printing in the conductor that does not contain the polycrystal is done on the second face 102 of the dielectric 100 by the above well-known printing method.

After that, the dielectric 100 with the signal conductor S" and the ground conductors G" is placed into the electric cooker or electric furnace to sinter the conductive paste as described above. In case (1) above, the sintered conductive paste becomes the polycrystal (signal conductor S"). In case (2) above, the sintered conductive paste becomes the polycrystal (second conductor portion S2"). In case (3) above, the sintered conductive paste becomes the polycrystal (third conductor portion S3"). In case (4) above, the sintered conductive pastes on the X- and X'-direction sides become the polycrystal (second conductor portion S2" and third conductor portion S3"). In case (6) above, the sintered conductive paste becomes the polycrystal (first ground conductor G" and/or second ground conductor G"). In case (7) above, the sintered conductive paste becomes the polycrystal (second conductor portion G2" of the first ground conductor G" and/or the second ground conductor G"). Thus the signal conductor S" and the pair of ground conductors G" of any of the above aspects are formed on the dielectric 100. Where the transmission board D3 includes the transmitter 300, the transmitter 300 is mounted on the first face 101 of the dielectric 100 and electrically and mechanically connected to the signal conductor S". The transmission board D3 is thus manufactured.

The transmission board D3 described above reduces the transmission loss (attenuation) of a high frequency signal to be transmitted through the transmission line 200" in a case where the high frequency signal is of frequencies within the one or more specific frequency bands for the following reasons.

Where a high frequency signal to be transmitted is of frequencies within the one or more specific frequency bands, the AC resistance value of the polycrystal forming at least the part of at least one conductor of the signal conductor S", the first ground conductor G", or the second ground conductor G" of the transmission line 200' drops sharply. This reduces the transmission loss of the high frequency signal.

Also, where the signal conductor S" includes the second conductor portion S2" composed of the polycrystal and/or the third conductor portion S3" composed of the polycrystal, the second conductor portion S2" and/or the third conductor portion S3" constitutes the portion(s) of the signal conductor S" with a higher current density of a high frequency signal during transmission of the high frequency signal (constitutes the portion of the signal conductor S" closer to the first ground conductor G" and/or the portion of the signal conductor S" closer to the second ground conductor G"). Where a high frequency signal to be transmitted is of frequencies within the one or more specific frequency bands, the AC resistance value(s) of the second conductor portion S2" and/or the third conductor portion S3" drop sharply. This reduces the transmission loss of the high frequency signal in the signal conductor S".

Where the first ground conductor G" and/or the second ground conductor G" includes the second conductor portion G2" composed of the polycrystal, the second conductor portion G2" constitutes the portion(s) of the first ground conductor G" and/or the second ground conductor G" with a higher current density of a high frequency signal during transmission of the high frequency signal (constitute the portion of the first ground conductor G" closer to the signal conductor S" and/or the portion of the second ground conductor G" closer to the signal conductor S"). Where a high frequency signal to be transmitted is of frequencies within the one or more specific frequency bands, the AC resistance value(s) of the second conductor portion(s) G2" drops sharply. This reduces the transmission loss of the high frequency signal in the first ground conductor G" and/or the second ground conductor G".

It should be noted that the transmission board D3 also provides the same technical features and effects as those of (B) above of the transmission board D1.

Fourth Embodiment

Figure 4A:
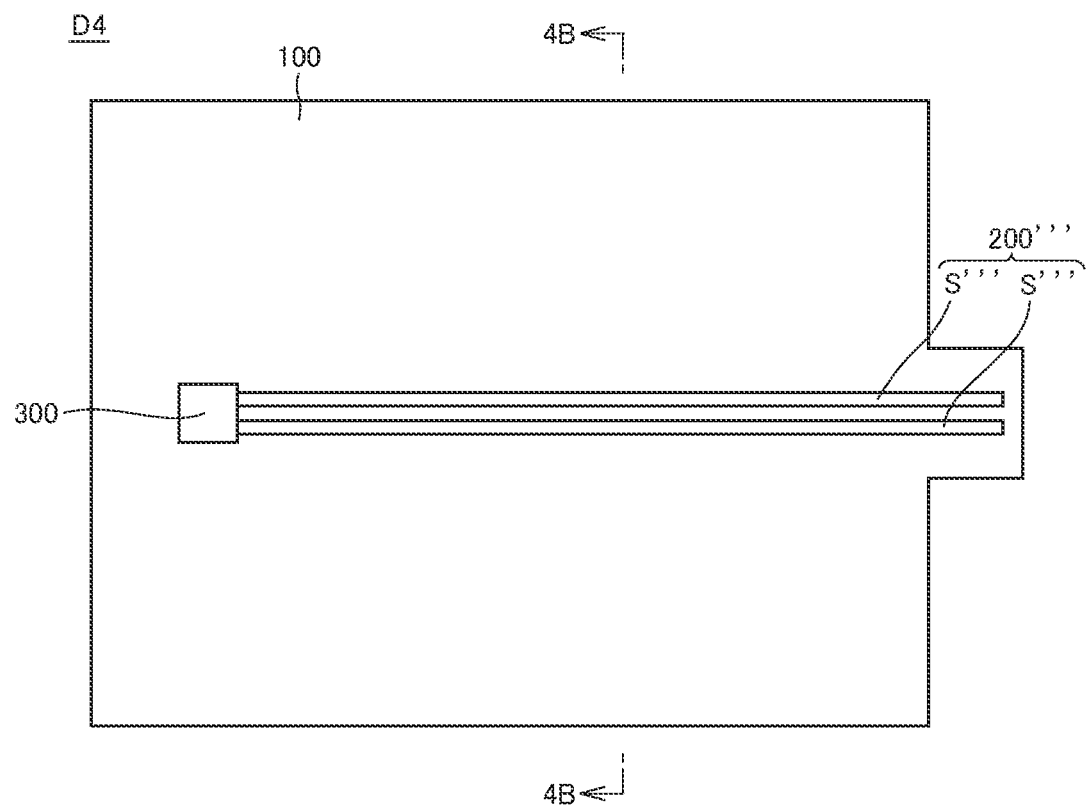
FIG. 4A is a schematic plan view of a high frequency transmission device according to a fourth embodiment of the invention.
Figure 4B:
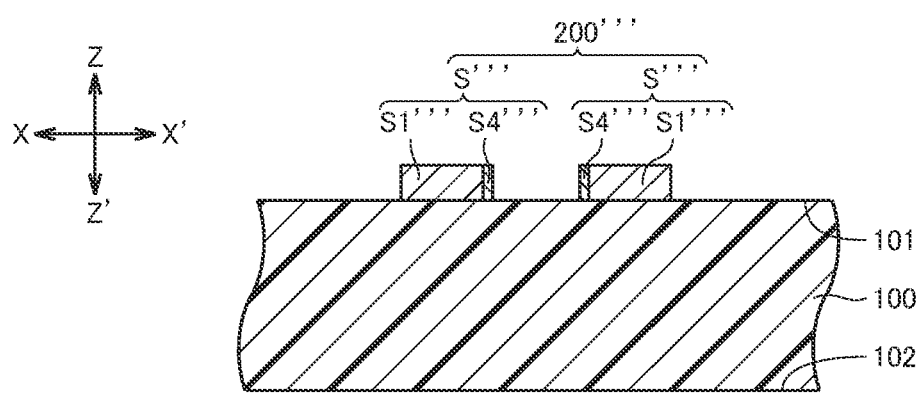
FIG. 4B is a partial cross-sectional view of the high frequency transmission device, taken along line 4B-4B in FIG. 4A.

The following is a description of a high frequency transmission device D4 according to a plurality of embodiments, including the fourth embodiment, of the invention with reference to FIGS. 4A and 4B. The high frequency transmission device D4 is a circuit board for high-frequency transmission. The high frequency transmission device D4 may also be referred to as a transmission board D4. FIGS. 4A and 4B show the transmission board D4 of the fourth embodiment. The transmission board D4 is similar in configuration to the transmission board D1, but is different in that a transmission line 200'" includes a pair of signal conductors S'". The differences will be described in detail, omitting description of overlaps with the transmission board D1. FIG. 4B indicates, in addition to the Z-Z' direction, an X-X' direction being the transverse direction of the signal conductor S".

The transmission line 200'" is located on the dielectric 100 as follows. The pair of signal conductors S'" of the transmission line 200" is provided on the first face 101 of the dielectric 100, extends from respective first positions to respective second positions on the first face 101 of the dielectric 100, and are arranged in spaced relation to each other in the X-X' direction. The pair of signal conductors S'" include a first signal conductor S' and a second signal conductor S'", which form a differential pair adapted for transmitting therethrough high frequency signals. Part or the whole of the first signal conductor S' may be composed of the polycrystal. In this case, it is preferable that part or the whole of the second signal conductor S'" be composed of the polycrystal, or alternatively the whole of the second signal conductor S' be composed of a conductor that does not contain the polycrystal. Alternatively, the whole of the first signal conductor S'" may be composed of a conductor that does not contain the polycrystal. In this case, part or the whole of the second signal conductor S'" may preferably be composed of the polycrystal. The time during transmission through the first signal conductor S'" and the second signal conductor S'" of a high frequency signal within the one or more specific frequency bands will be referred to as "during transmission of a high frequency signal".

During transmission of a high frequency signal, due to the skin effect, the high frequency signal has a higher current density in a portion of the first signal conductor S'" that is closer to the second signal conductor S'" (portion of the first signal conductor S' that is electrically coupled more strongly to the second signal conductor S'") and in a portion of the second signal conductor S'" that is closer to the first signal conductor S'" (portion of the second signal conductor S'" that is electrically coupled more strongly to the first signal conductor S'").

Where part of the first signal conductor S' and/or part of the second signal conductor S' is composed of the polycrystal, the first signal conductor S'" and/or the second signal conductor S'" may include a first conductor portion S1' and a fourth conductor portion S4'".

The first conductor portion S1'" of the first signal conductor S'" and/or the second signal conductor S'" is similar in configuration to the first conductor portion S1 of the transmission board D1, but different in that the first conductor portion S1'" is provided on the first face 101 of the dielectric 100 and extends from a first position to a second position.

The fourth conductor portion S4'" of the first signal conductor S'" and/or the second signal conductor S'" is composed of the polycrystal.

The fourth conductor portion S4' of the first signal conductor S'" is provided on the first face 101 of the dielectric 100, is fixed to at least part of the face on the X'-direction side of the first conductor portion S1'" of the first signal conductor S'", and is arranged closer to the second signal conductor S'" than the first conductor portion S1'" is. The fourth conductor portion S4'" of the first signal conductor S'" thus constitutes the portion of the first signal conductor S'" that is electrically coupled more strongly to the second signal conductor S'" (portion with a higher current density of a high frequency signal) during transmission of the high frequency signal. The fourth conductor portion S4'" of the first signal conductor S'" may preferably extend from the first position to the second position along the face on the X'-direction side of the first conductor portion S1'" of the first signal conductor S'", but may be discontinuous at one or more places.

The fourth conductor portion S4'" of the second signal conductor S'" is provided on the first face 101 of the dielectric 100, is fixed to at least part of the face on the X'-direction side of the first conductor portion S1'" of the second signal conductor S'", and is arranged closer to the first signal conductor S'" than the first conductor portion S1'" is. The fourth conductor portion S4'" of the second signal conductor S'" thus constitutes the portion of the second signal conductor S'" that is electrically coupled more strongly to the first signal conductor S'" (portion with a higher current density of a high frequency signal) during transmission of the high frequency signal. The fourth conductor portion S4''' of the second signal conductor S''' may preferably extend from the first position to the second position along the face on the X'-direction side of the first conductor portion S1'' of the second signal conductor S''', but may be discontinuous at one or more places.

It should be noted that the first and second connecting portions of the first conductor portion(s) S1''' are not covered in the Z direction by the fourth conductor portion S4'''. Therefore, at least one connecting portion of the first or second connecting portion of the first conductor portion S1''' corresponds to the connecting portion of the first conductor portion of the signal conductor recited in the claims. Where the face on the Z-direction side of the at least one connecting portion is to be elastically or slidingly contacted by a connector terminal (connection target), it is possible to prevent wear on or damage to the fourth conductor portion(s) S4''' due to elastic contact or sliding contact of the connector terminal because the fourth conductor portion(s) S4''' is not provided on the face on the Z-direction side of at least one connecting portion.

A method for manufacturing the above transmission board D4 will now be described. The dielectric 100 is prepared. Thereafter, the first signal conductor S''' is formed on the first face 101 of the dielectric 100 in one of the following manners (1) or (2), and the second signal conductor S''' is formed on the first face 101 of the dielectric 100 in one of the following manners (3) or (4).

(1) Where the first signal conductor S''' is composed only of the polycrystal, the conductive paste containing conductor nanoparticles as the main component is prepared as described above, and printing in the conductive paste is done on the first face 101 of the dielectric 100 by a well-known printing method (for example, a screen-printing method, an inkjet-printing method, or a spray-printing method).

(2) Where the first signal conductor S''' includes the first conductor portion S1''' and the fourth conductor portion S4''', the conductive paste containing conductor nanoparticles as the main component is prepared as described above, printing in the conductor to form the first conductor portion S1''' is done on the first face 101 of the dielectric 100 by the above well-known printing method, and printing in the conductive paste to form the fourth conductor portion S4''' is done, on the X'-direction side relative to the first conductor portion S1''', on the first face 101 of the dielectric 100 by the above well-known printing method.

(3) Where the second signal conductor S' is composed only of the polycrystal, the conductive paste containing conductor nanoparticles as the main component is prepared as described above, and printing in the conductive paste is done on the first face 101 of the dielectric 100 by a well-known printing method (for example, a screen-printing method, an inkjet-printing method, or a spray-printing method).

(4) Where the second signal conductor S''' includes the first conductor portion S1''' and the fourth conductor portion S4', the conductive paste containing conductor nanoparticles as the main component is prepared as described above, printing in the conductor to form the first conductor portion S1' is done on the first face 101 of the dielectric 100 by the above well-known printing method, and printing in the conductive paste to form the fourth conductor portion S4''' is done, on the X'-direction side relative to the first conductor portion S1''', on the first face 101 of the dielectric 100 by the above well-known printing method.

Thereafter, the dielectric 100 with the pair of the signal conductors S''' is placed into the electric cooker or electric furnace to sinter the conductive paste as described above. In case (1) above, the sintered conductive paste becomes the polycrystal (first signal conductor S'''). In case (2) above, the sintered conductive paste becomes the polycrystal (fourth conductor portion S4''' of the first signal conductor S'''). In case (3) above, the sintered conductive paste becomes the polycrystal (second signal conductor S'''). In case (4) above, the sintered conductive paste becomes the polycrystal (fourth conductor portion S4''' of the second signal conductor S'''). Thus the pair of signal conductors S''' of any of the above aspects is formed on the dielectric 100. Where the transmission board D4 includes the transmitter 300, the transmitter 300 is mounted on the first face 101 of the dielectric 100 and electrically and mechanically connected to the pair of signal conductors S'''. The transmission board D4 is thus manufactured.

The transmission board D4 described above reduces the transmission loss (attenuation) of a high frequency signal to be transmitted through the transmission line 200' in a case where the high frequency signal is of frequencies within the one or more specific frequency bands for the following reasons.

Where a high frequency signal to be transmitted is of frequencies within the one or more specific frequency bands, the AC resistance value of the polycrystal forming at least the part of at least one conductor of the pair of signal conductors S''' of the transmission line 200''' drops sharply. This reduces the transmission loss of the high frequency signal.

Also, where the first signal conductor S''' and/or the second signal conductor S''' include the fourth conductor portion S4''' composed of the polycrystal, the fourth conductor portion S4''' constitutes the portion(s) of the first signal conductor S''' and/or the second signal conductor S''' with a higher current density of a high frequency signal during transmission of the high frequency signal (constitutes the portion closer to the first signal conductor S''' and/or the portion closer to the second signal conductor S'''). Where a high frequency signal to be transmitted is of frequencies within the one or more specific frequency bands, the AC resistance value(s) of the fourth conductor portion(s) S4''' of the first signal conductor S''' and/or the second signal conductor S''' drop sharply. This reduces the transmission loss of the high frequency signal in the first signal conductor S''' and/or the second signal conductor S'''.

It should be noted that the transmission board D4 also provides the same technical features and effects as those of (B) above of the transmission board D1.

Fifth Embodiment

Figure 5:
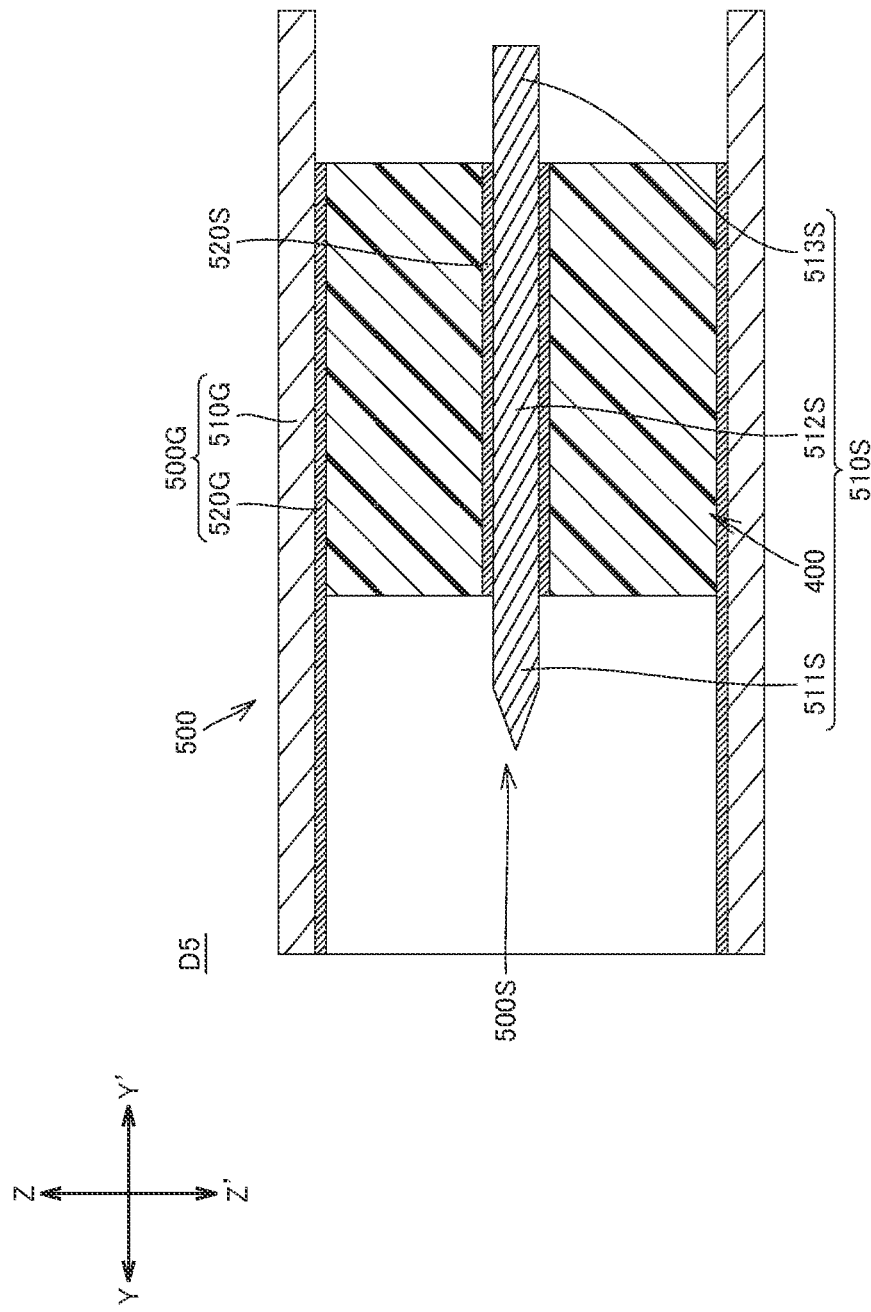
FIG. 5 is a schematic cross-sectional view of a high frequency transmission device according to a fifth embodiment of the invention.
Figure 6A:
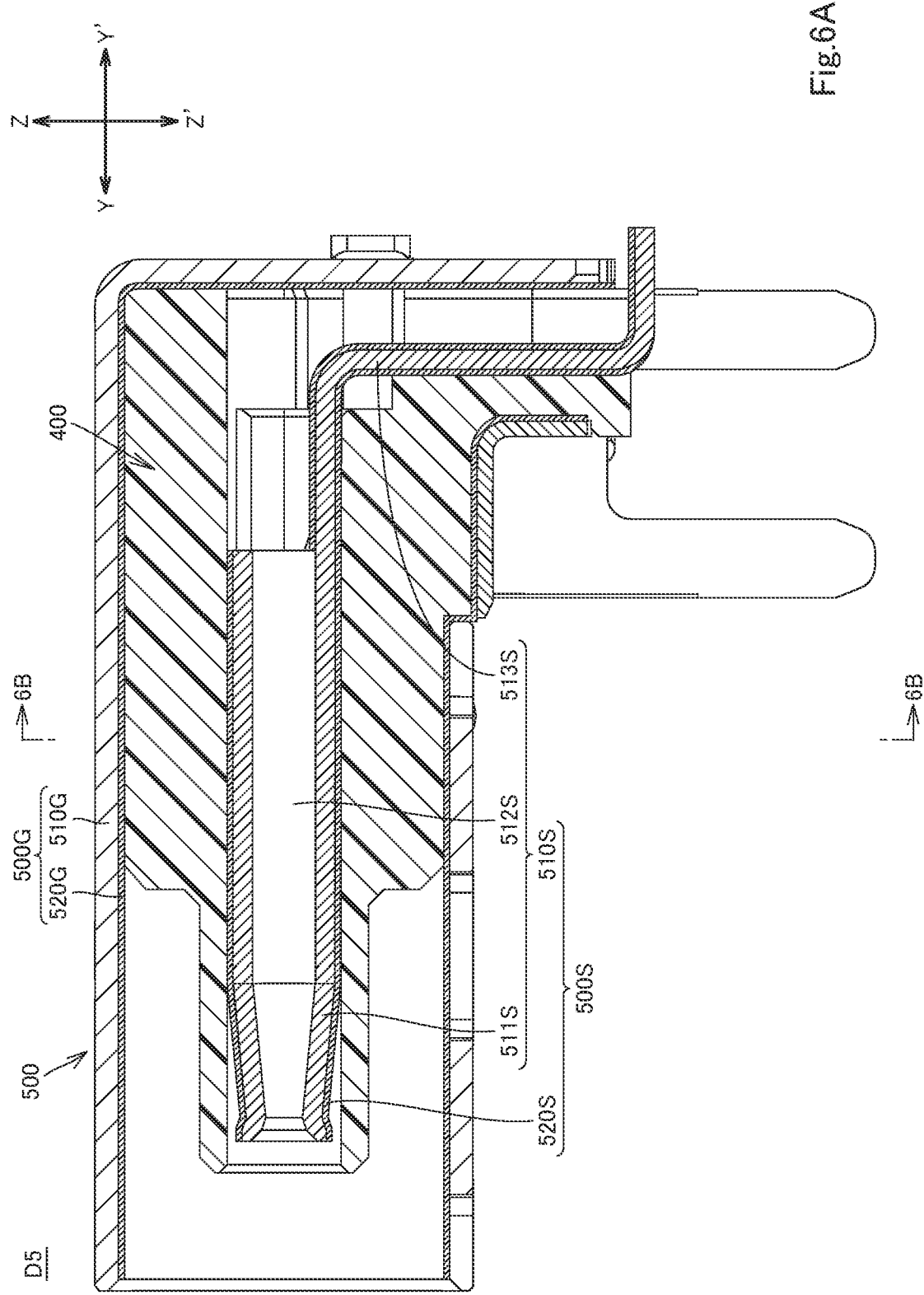
FIG. 6A is a cross-sectional view of a high frequency transmission device according to another embodiment in which the high frequency transmission device is a coaxial connector.
Figure 6B:
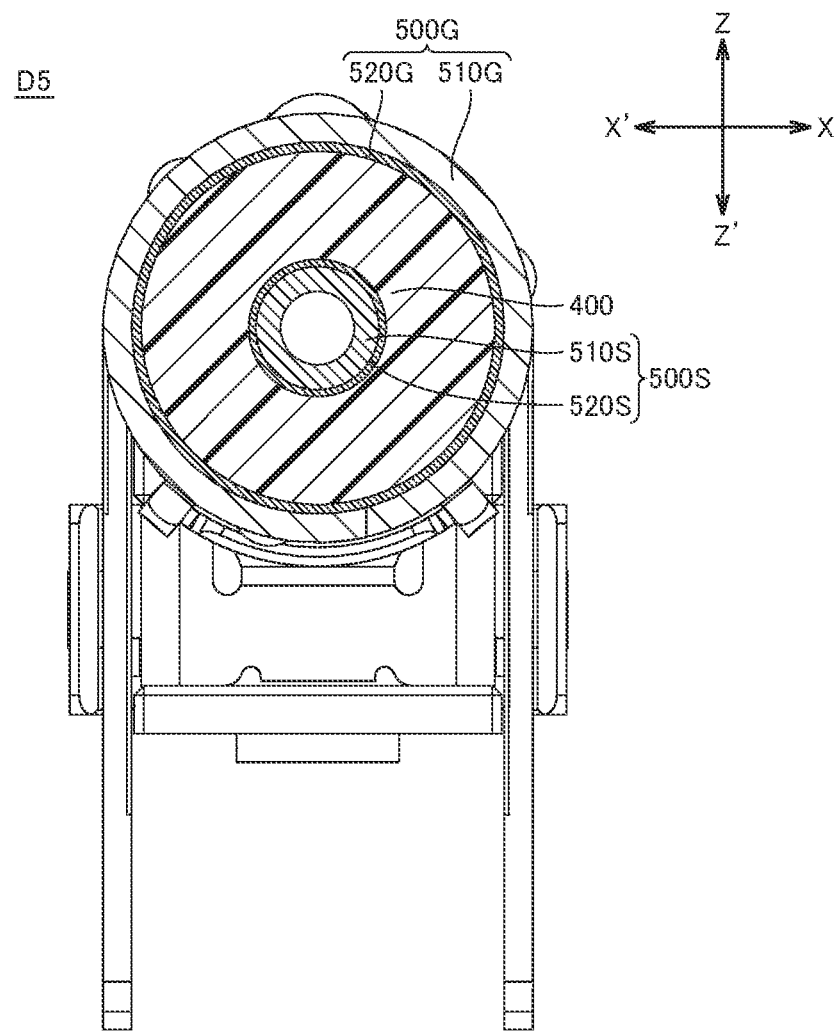
FIG. 6B is a transverse sectional view of the high frequency transmission device, taken along line 6B-6B in FIG. 6A.

The following is a description of a high frequency transmission device D5 according to a plurality of embodiments, including the fifth embodiment, of the invention with reference to FIGS. 5, 6A, and 6B. The high frequency transmission device D5 is a connector for high-frequency transmission. The high frequency transmission device D5 may also be referred to as a connector D5. FIG. 5 is a schematic diagram of the connector D5 of the fifth embodiment, and FIGS. 6A and 6B show another embodiment in which the connector D5 of the fifth embodiment is a coaxial connector. It should be noted that FIGS. 5 and 6A indicate the Z-Z' and Y-Y' directions, and FIG. 6B indicates the Z-Z' and X-X' directions. The Z-Z' direction corresponds to the height direction of the connector D5, the Y-Y' direction is substantially orthogonal to the Z-Z' direction, and the X-X' direction is substantially orthogonal to the Z-Z' and Y-Y' directions.

The connector D5 includes a dielectric 400, which is a body made of an insulating resin, and a transmission line 500 adapted for transmitting therethrough high frequency signals. The time during transmission through the transmission line 500 of a high frequency signal within the one or more specific frequency bands will be referred to as "during transmission of a high frequency signal". The transmission line 500 includes a signal conductor 500S and a ground conductor 500G (first ground conductor), which are adapted for transmitting therethrough high frequency signals. The signal conductor 500S of the transmission line 500 is a terminal of the connector D5, and at least part of the signal conductor 500S is held by the dielectric 400. In other words, the at least part of the signal conductor 500S is located inside the dielectric 400. The ground conductor 500G of the transmission line 500 is a shell of the connector D5 and houses and holds the dielectric 400 holding the signal conductor 500S. The ground conductor 500G extends along the at least part of the housed signal conductor 500S.

Part or the whole of the signal conductor 500S may be composed of the polycrystal described above. In this case, it is preferable that part or the whole of the ground conductor 500G be composed of the polycrystal, or alternatively the whole of the ground conductor 500G be composed of a conductor that does not contain the polycrystal. Alternatively, the whole of the signal conductor 500S may be composed of a conductor that does not contain the polycrystal. In this case, part or the whole of the ground conductor 500G may preferably be composed of the polycrystal.

Where part of the signal conductor 500S is composed of the polycrystal, the signal conductor 500S may include a first conductor portion 510S and a second conductor portion 520S. The first conductor portion 510S is a terminal body composed of one of the following materials: a material having a DC resistance value that is smaller than that of the polycrystal, or an anti-oxidant material or other anti-corrosive material. The first conductor portion 510S is made of, for example, a metal plate or the like.

The first conductor portion 510S includes a distal portion 511S, an intermediate portion 512S, and a tail portion 513S. It is preferable that the intermediate portion 512S extend in the Y-Y' direction and at least part thereof be held by the dielectric 400. The distal portion 511S is only required to extend from the intermediate portion 512S in the Y direction and be protruded or exposed from the dielectric 400. The distal portion 511S serves as a first connecting portion of the first conductor portion 510S and is contactable with a terminal of a mating connector (not shown). The tail portion 513S is only required to extend from the intermediate portion 512S in a direction including at least one component of the Y' or Z' direction, and to be protruded or exposed from the dielectric 400. The tail portion 513S serves as a second connecting portion of the first conductor portion 510S and is electrically and mechanically connectable to a signal conductor of a circuit board or cable (not shown).

The second conductor portion 520S is composed of the polycrystal described above, is provided on the outer perimeter face of at least part of the first conductor portion 510S, and is located closer to the ground conductor 500G than the first conductor portion 510S is. For example, as shown in FIG. 5, the second conductor portion 520S may be provided on the outer perimeter face of the intermediate portion 512S of the first conductor portion 510S and may form a generally ring-shaped body in a cross-sectional view in the Z-Z' direction.

Where part of the ground conductor 500G is composed of the polycrystal, the ground conductor 500G may include a first conductor portion 510G and a second conductor portion 520G.

The first conductor portion 510G is a shell body and is composed of one of the following materials: a material having a DC resistance value that is smaller than that of the polycrystal, or an anti-oxidant material or other anti-corrosive material. The first conductor portion 510G is made of, for example, a metal plate or the like.

The second conductor portion 520G is composed of the polycrystal described above, is provided on an inner perimeter face of at least part of the first conductor portion 510G, and is located closer the signal conductor 500S than the first conductor portion 510G is. For example, as shown in FIG. 5, where the first conductor portion 510G includes a tubular portion extending in the Y-Y' direction, the second conductor portion 520G may be provided on an inner perimeter face of the tubular portion of the first conductor portion 510G, and generally form a ring in a cross-sectional view in the Z-Z' direction.

The first conductor portion 510G may further include a connecting portion not covered by the second conductor portion 520G. The connecting portion of the first conductor portion 510G is, for example, a leg of the shell body or an end portion in the Y' direction of the shell body, and may preferably be connectable to a ground conductor of the circuit board or the cable.

The connector D5 may be a coaxial connector as shown in FIGS. 6A and 6B. In this case, the signal conductor 500S and the ground conductor 500G form a coaxial line adapted for transmitting therethrough high frequency signals.

The signal conductor 500S is a terminal of the connector D5, held by the dielectric 400, and housed in the ground conductor 500G, together with the dielectric 400, to form a central conductor of the coaxial line. The first conductor portion 510S of the signal conductor 500S may have one of the following configurations (a) to (d).

(a) As shown in FIGS. 6A and 6B, the intermediate portion 512S has a tubular shape extending in the Y-Y' direction. The distal portion 511S includes a pair of arms (one of them shown) extending in the Y direction from the intermediate portion 512S. The tail portion 513S is a generally L-shaped plate extending in the Y' direction from the intermediate portion 512S. In this case, the inner faces of the arms of the distal portion 511S serve as the first connecting portion of the first conductor portion 510S, and the rear end portion of the tail portion 513S serves as the second connecting portion of the first conductor portion 510S. The first connecting portion of the first conductor portion 510S is elastically contactable with a distal portion of the terminal of the mating connector (not shown) received between the arms. The second connecting portion of the first conductor portion 510S is electrically and mechanically connectable to a circuit board (not shown).

(b) The distal portion 511S and the intermediate portion 512S of the first conductor portion 510S are straight rods or flat plates extending in the Y-Y' direction, and the tail portion 513S of the first conductor portion 510S is a generally L-shaped rod or plate extending in the Y' direction from the intermediate portion 512S. In this case, the outer perimeter face of the distal portion 511S serves as the first connecting portion of the first conductor portion 510S, and the rear end portion of the tail portion 513S serves as the second connecting portion of the first conductor portion 510S.

(c) The first conductor portion 510S is similar in configuration to configuration (a) above, but different in that the tail portion 513S is not a generally L-shaped plate but has a straight shape extending in the Y' direction.

(d) The first conductor portion 510S is similar in configuration to configuration (b) above, but different in that the tail portion 513S is not a generally L-shaped plate but has a straight shape extending in the Y' direction.

In case (c) and (d), the second connecting portion of the first conductor portion 510S is connectable to a cable or the like, not to a circuit board.

Where the first conductor portion 510S has configuration (a) or (c) above, the second conductor portion 520S is provided on the outer faces of the arms of the distal portion 511S, the outer perimeter face of the intermediate portion 512S, and the outer perimeter face of the tail portion 513S excluding the second connecting portion; or alternatively provided on the outer perimeter face of the intermediate portion 512S, and the outer perimeter face of the tail portion 513S excluding the second connecting portion. In the former case, the inner faces of the arms of the distal portion 511S and the inner perimeter face of the intermediate portion 512S are not covered by the second conductor portion 520S. In the latter case, the inner faces of the arms of the distal portion 511S, the outer faces of the arms of the distal portion 511S, and the inner perimeter face of the intermediate portion 512S are not covered by the second conductor portion 520S.

In any of the aspects, the first connecting portion of the arms of the distal portion 511S of the signal conductor 500S is not covered by the second conductor portion 520S. The first connecting portion of the distal portion 511S of the signal conductor 500S corresponds to the connecting portion of the first conductor portion of the signal conductor recited in the claims. The arms of the distal portion 511S of the signal conductor 500S are elastically contactable with a distal portion of a terminal of a mating connector by receiving therebetween the distal portion of the terminal. However, the second conductor portion 520S is not provided on the first connecting portion of the arms of the distal portion 511S of the signal conductor 500S, which prevents wear or damage to the second conductor portion 520S by the distal portion of the terminal of the mating connector. Where the outer faces of the arms of the distal portion 511S of the signal conductor 500S are not covered by the second conductor 520S either, the second conductor 520S will not be damaged due to the elastic deformation of the arms of the distal portion 511S of the signal conductor 500S.

Where the first conductor portion 510S has configuration (b) or (d) above, the second conductor portion 520S is provided on the outer perimeter face of the distal portion 511S excluding the first connecting portion, the outer perimeter face of the intermediate portion 512S, and the outer perimeter face of the tail portion 513S excluding the second connecting portion.

In this case, the first connecting portion of the distal portion 511S of the signal conductor 500S is not covered by the second conductor portion 520S. In other words, the first connecting portion of the distal portion 511S of the signal conductor 500S corresponds to the connecting portion of the first conductor portion of the signal conductor recited in the claims. The first connecting portion of the distal portion 511S of the signal conductor 500S is to be elastically or slidingly contacted by a terminal of a mating connector. However, the second conductor portion 520S is not provided on the first connecting portion of the distal portion 511S of the signal conductor 500S, which prevents wear or damage to the second conductor 520S due to elastic or sliding contact by the terminal of the mating connector.

The ground conductor 500G is a tubular shell of the connector D5, houses and holds the dielectric 400, and extends along at least part of the central conductor of the coaxial line to form an outer conductor of the coaxial line. Where the first conductor portion 510S of the ground conductor 500G has configuration (a) or (c) above, the first conductor portion 510G may preferably be a tube of a generally L-shape in a side view (see FIGS. 6A and 6B). Where the first conductor portion 510S has configuration (b) or (d) above, the first conductor portion 510G may preferably be a straight tube extending in the Y-Y' direction. In either case, the first conductor portion 510G may preferably be generally ring-shaped in the Z-Z' direction. The Z-Z' direction corresponds to the orthogonal direction recited in the claims.

The second conductor portion 520G of the ground conductor 500G is a tube provided on the inner perimeter face of part of the first conductor portion 510G of any of the above aspects, or alternatively a tube provided in almost the entire region of the inner perimeter face of the first conductor portion 510G of any of the above aspects. In either aspect, the second conductor portion 520G is generally ring-shaped in at least the Z-Z' direction and is located closer to the signal conductor 500S than the first conductor portion 510G is.

A method for manufacturing the above connector D5 will now be described. First, the signal conductor 500S is obtained in one of the following manners (1) to (3).

(1) Where the signal conductor 500S is composed only of the polycrystal, the conductive paste containing conductor nanoparticles as the main component is prepared as described above, a mold (not shown) is filled with the conductive paste, and the mold is heated in the electric cooker or electric furnace to sinter the conductive paste. Thereafter, the sintered conductive paste is removed from the mold. The sintered conductive paste becomes the polycrystal (signal conductor 500S).

(2) Where the signal conductor 500S includes the first conductor portion 510S and the second conductor portion 520S, the first conductor portion 510S is prepared. Then, the conductive paste containing conductor nanoparticles as the main component is prepared as described above, and the conductive paste is applied, sprayed, or printed onto the outer perimeter face of the at least part of the first conductor portion 510S. Thereafter, the first conductor portion 510S with the conductive paste is heated in the electric cooker or electric furnace to sinter the conductive paste. The sintered conductive paste becomes the above polycrystal (second conductor portion 520S).

(3) Where the signal conductor 500S does not contain the polycrystal, the signal conductor 500S is obtained by a well-known method for manufacturing terminals.

Next, the ground conductor 500G is obtained in one of the following manners (4) to (6).

(4) Where the ground conductor 500G is composed only of the polycrystal, the conductive paste containing conductor nanoparticles as the main component is prepared as described above, a mold (not shown) is filled with the conductive paste, and the mold is heated in the electric cooker or electric furnace to sinter the conductive paste. Thereafter, the sintered conductive paste is removed from the mold. This sintered conductive paste becomes the polycrystal (ground conductor 500G).

(5) Where the ground conductor 500G includes the first conductor portion 510G and the second conductor portion 520G, the first conductor portion 510G is prepared. Then, the conductive paste containing conductor nanoparticles as the main component is prepared as described above, and the conductive paste is applied, sprayed, or printed onto the outer perimeter face of the at least part of the first conductor portion 510G. Thereafter, the first conductor portion 510G with the conductive paste is heated in the electric cooker or electric furnace to sinter the conductive paste. The sintered conductive paste becomes the polycrystal (second conductor portion 520G).

(6) Where the ground conductor 500G does not contain the polycrystal, the ground conductor 500G is obtained by a well-known method for manufacturing shells.

Thereafter, the signal conductor 500S is inserted into a hole of the dielectric 400 to be held in the dielectric 400. Alternatively, the signal conductor 500S is insert-molded in a synthetic resin to be held by the dielectric 400. After that, the dielectric 400 is housed and held in the ground conductor 500G. The connector D5 is thus manufactured.

The connector D5 described above provides the following technical features and effects.

(A) It is possible to reduce the transmission loss (attenuation) of a high frequency signal to be transmitted through the transmission line 500 in a case where the high frequency signal is of frequencies within the one or more specific frequency bands for the following reasons.

Where a high frequency signal to be transmitted is of frequencies within the one or more specific frequency bands, the AC resistance value of the polycrystal forming at least part of at least one conductor of the signal conductor 500S or the ground conductor 500G of the transmission line 500 drops sharply. This reduces the transmission loss of the high frequency signal.

Also, where the signal conductor 500S includes the second conductor portion 520S composed of the polycrystal, the second conductor portion 520S constitutes the portion of the signal conductor 500S with a higher current density of a high frequency signal during transmission of the high frequency signal (constitutes the portion closer to the ground conductor 500G). Where a high frequency signal to be transmitted is of frequencies within the one or more specific frequency bands, the AC resistance value of the second conductor portion 520S drops sharply. This reduces the transmission loss of the high frequency signal in the signal conductor 500S.

Where the ground conductor 500G includes the second conductor portion 520G composed of the polycrystal, the second conductor portion 520G constitutes the portion of the ground conductor 500G with a higher current density of a high frequency signal during transmission of the high frequency signal (constitutes the portion closer to the signal conductor 500S). Where a high frequency signal to be transmitted is of frequencies within the one or more specific frequency bands, the AC resistance value of the second conductor portion 520G drops sharply. This reduces the transmission loss of the high frequency signal in the ground conductor 500G.

(B) Where the signal conductor 500S includes the first conductor portion 510S and the second conductor portion 520S, it is possible to improve the reliability of connection of the connector D5 to a mating connector for the following reasons. The first conductor portion 510S is composed of at least one of the following materials: a material having a DC resistance value that is smaller than that of the polycrystal, or an anti-oxidant material or other anti-corrosive material. As such, the first connecting portion of the first conductor portion 510S can be brought into contact, and into electric connection, with a terminal of the mating connector, and the second connection portion of the first conductor portion 510S can be electrically and mechanically connected to a circuit board or a cable.

Where the ground conductor 500G includes the first conductor portion 510G and the second conductor portion 520G, it is possible to improve the reliability of connection of the connector D5 with respect to grounding for the following reasons.

The first conductor portion 510G is composed of at least one of the following materials: a material having a DC resistance value that is smaller than that of the polycrystal, or an anti-oxidant material or other anti-corrosive material. It is possible to connect the first conductor portion 510G to the ground.

It should be noted that the above high frequency transmission devices are not limited to the above-described embodiments, may be modified as appropriate within the scope of the claims. The details will be described below.

The transmission board D1 of any of the above aspects may be configured such that the pair of ground conductors G" of any of the above aspects of the transmission board D3 is provided on the first face 101 of the dielectric 100 with the signal conductor S arranged between the ground conductors G". In this case, the signal conductor S may include, in addition to the first conductor portion S1 and the second conductor portion S2, the second conductor portion S2" and/or the third conductor portion S3".

The transmission board D2 of any of the above aspects may be configured such that the pair of ground conductors G" of any of the above aspects of the transmission board D3 is provided inside the dielectric 100' with the signal conductor S' arranged between the ground conductors G". In this case, the signal conductor S' may include, in addition to the first conductor portion S1', the second conductor portion S2', and the third conductor portion S3', the second conductor portion S2" and/or the third conductor portion S3".

Figure 7:
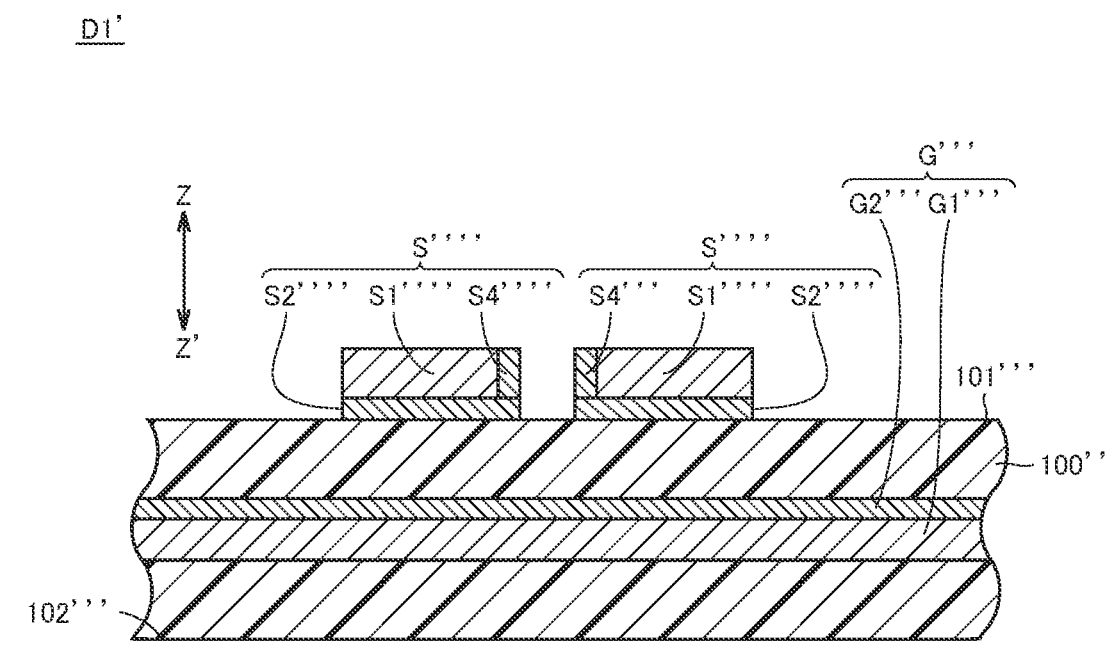
FIG. 7 is a schematic cross-sectional view of a variant of the high frequency transmission device of the first embodiment.

The transmission boards D1 to D2 of any of the above aspects may include a plurality of signal conductors of any of the above aspects provided on or in the dielectric. The signal conductors may include a first signal conductor and a second signal conductor arranged in spaced relation to each other in the transverse direction of the signal conductors. For example, the transmission board D1 can be modified into a transmission board D1' as shown in FIG. 7. The transmission board D1' includes a dielectric 100" and a transmission line. The dielectric 100" has a first face 101" and a second face 102" on the opposite side from the first face 101". The transmission line includes first and second signal conductors S"" and a ground conductor G''', which are adapted for transmitting therethrough high frequency signals. The first and second signal conductors S"" are provided on the first face 101" of the dielectric 100" and located on the Z-direction side relative to the ground conductor G'''. The first and second signal conductors S"" each include a first conductor portion S1"", a second conductor portion S2"", and a fourth conductor portion S4". The second conductor portions S2" of the first and second signal conductors S"" are provided on the first face 101" of the dielectric 100" and is arranged closer to the ground conductor G' than the first conductor portions S1"" are. The first conductor portions S1"" of the first and second signal conductors S"" are fixed to the corresponding second conductor portions S2"". The fourth conductor portion S4"" of the first signal conductor S"" is arranged closer to the second signal conductor S"" than the first conductor portion S1"" of the first signal conductor S"" is. The fourth conductor portion S4"" of the second signal conductor S"" is arranged closer to the first signal conductor S"" than the first conductor portion S1"" of the second signal conductor S"" is. The ground conductor G'" may be provided inside the dielectric 100", or alternatively on the second face 102 of the dielectric 100". The ground conductor G'" includes a first conductor portion G1'" and a second conductor portion G2'". The second conductor portion G2'" is arranged closer to the first and second signal conductors S"" than the first conductor portion G1'" is. The first conductor portion G1'" is fixed to the second conductor portion G2'".

In the transmission board of any of the above aspects, the signal conductor or conductors and/or the ground conductor or conductors may be provided not on the dielectric but inside the dielectric (see FIG. 7 for illustration). Where the signal conductor or conductors and the ground conductor or conductors are provided inside the dielectric, the whole of the transmission line is located inside the dielectric.

A transmission board of the invention may include a dielectric being a multilayer circuit board having a plurality of layers, and a transmission line adapted for transmitting therethrough high frequency signals. This transmission line may include a plurality of ground conductors and a signal conductor. The ground conductors are solid conductors being provided in a plurality of layers of the dielectric and each having an opening. The signal conductor may be a via hole provided in the dielectric and located within the openings of the plurality of ground conductors. Where the signal conductor includes a first conductor portion and a second conductor portion, the first conductor portion may be tubular, and the second conductor portion may be tubular and provided on the outer perimeter face of at least part of the first conductor portion. The second conductor portion may be arranged closer to the plurality of ground conductors than the first conductor portion is. Where the ground conductors each include a first conductor portion and a second conductor portion, each first conductor portion may be a portion of the corresponding ground conductor that does not include an edge portion of the opening, and each second conductor portion may be the ring-shaped edge portion of the opening and may be configured to be arranged closer to the signal conductor than the corresponding first conductor portion is.

The connector D5 of any of the above aspects may include a ground conductor of plate shape. In this case, the connector may have a configuration corresponding to that of the transmission boards D1 to D3. The connectors corresponding to the transmission boards D1, D2, and D3 will be referred to as first, second, and third variant connectors.

In the first variant connector, as shown in FIG. 8A, a plate-shaped ground conductor 500G' of a transmission line 500' is provided inside a dielectric 400, is arranged on the Z'-direction side relative to a signal conductor 500S', and extends along at least part of the signal conductor 500S'. The ground conductor 500G' and the signal conductor 500S' constitute a microstrip line. Where the signal conductor 500S' includes a first conductor portion 510S and a second conductor portion 520S, the second conductor portion 520S may preferably be provided on the Z'-direction side relative to the first conductor portion 510S (on the side closer to the plate-shaped ground conductor). The ground conductor 500G' may include a first conductor portion 510G' and a second conductor portion 520G'. The second conductor portion 520G' may preferably be provided on the Z-direction side relative to the first conductor portion 510G' (on the side closer to the signal conductor 500S').

The first variant connector may further include first and second ground conductors inside a dielectric 400, and the first and second ground conductors may be arranged on the X- and X'-direction sides, respectively, relative to the signal conductor 500S' of any of the above aspects. The first and second ground conductors also extend along at least part of the signal conductor 500S'. The signal conductor 500S' may include, in addition to the first conductor portion 510S and the second conductor portion 520S, a second conductor portion S2" and/or a third conductor portion S3", as with the transmission board D3. It is preferable that the second conductor portion S2" be provided on the X-direction side relative to the first conductor portion 510S (on the side closer to the first ground conductor), and the third conductor portion S3" be provided on the X'-direction side relative to the first conductor portion 510S (on the side closer to the second ground conductor). At least one conductor of the first ground conductor or the second ground conductor may include a first conductor portion G1" and a second conductor portion G2", as with the transmission board D3.

In the second variant connector, as shown in FIG. 8B, a transmission line 500" includes a pair of plate-shaped ground conductors 500G' provided inside a dielectric 400. The pair of ground conductors 500G' include first and second ground conductors 500G'. The first ground conductor 500G' is arranged on the Z'-direction side relative to a signal conductor 500S" and extends along at least part of the signal conductor 500S", and the second ground conductor 500G' is arranged on the Z-direction side relative to the signal conductor 500S" and extends along at least part of the signal conductor 500S". The pair of ground conductors 500G' and the signal conductor 500S" form a strip line. The signal conductor 500S" may include a first conductor portion 510S, a second conductor portion 520S, and a third conductor portion 530S. It is preferable that the second conductor portion 520S be provided on the Z'-direction side relative to the first conductor portion 510S (on the side closer to the first ground conductor 500G') and the third conductor portion 530S be provided on the Z-direction side relative to the first conductor portion 510S (on the side closer to the second ground conductor 500G'). Each of, or one of, the first ground conductor 500G' and the second ground conductor 500G' may include a first conductor portion 510G' and a second conductor portion 520G'. The second conductor portion 520G' of the first ground conductor 500G' may preferably be provided on the Z-direction side relative to the first conductor portion 510G' of the first ground conductor 500G' (the signal conductor 500S"). The second conductor portion 520G' of the second ground conductor 500G' may preferably be provided on the Z'-direction side relative to the first conductor portion 510G' of the second ground conductor 500G' (the signal conductor 500S").

The second variant connector may further include third and fourth ground conductors inside the dielectric 400', and the third and fourth ground conductors may be arranged on the X- and X'-direction sides, respectively, relative to the signal conductor 500S" of any of the above aspects. The third and fourth ground conductors also extend along at least part of the signal conductor 500S". The signal conductor 500S" may include, in addition to the first conductor portion 510S, the second conductor portion 520S, and the third conductor portion 530S, a second conductor portion S2" and/or a third conductor portion S3", as with the transmission board D3. It is preferable that the second conductor portion S2" be provided on the X-direction side relative to the first conductor portion 510S (on the side closer to the third ground conductor), and the third conductor portion S3" be provided on the X'-direction side relative to the first conductor portion 510S (on the side closer to the fourth ground conductor). At least one conductor of the third ground conductor or the fourth ground conductor may include a first conductor portion G1" and a second conductor portion G2", as with the transmission board D3.

Figure 8C:
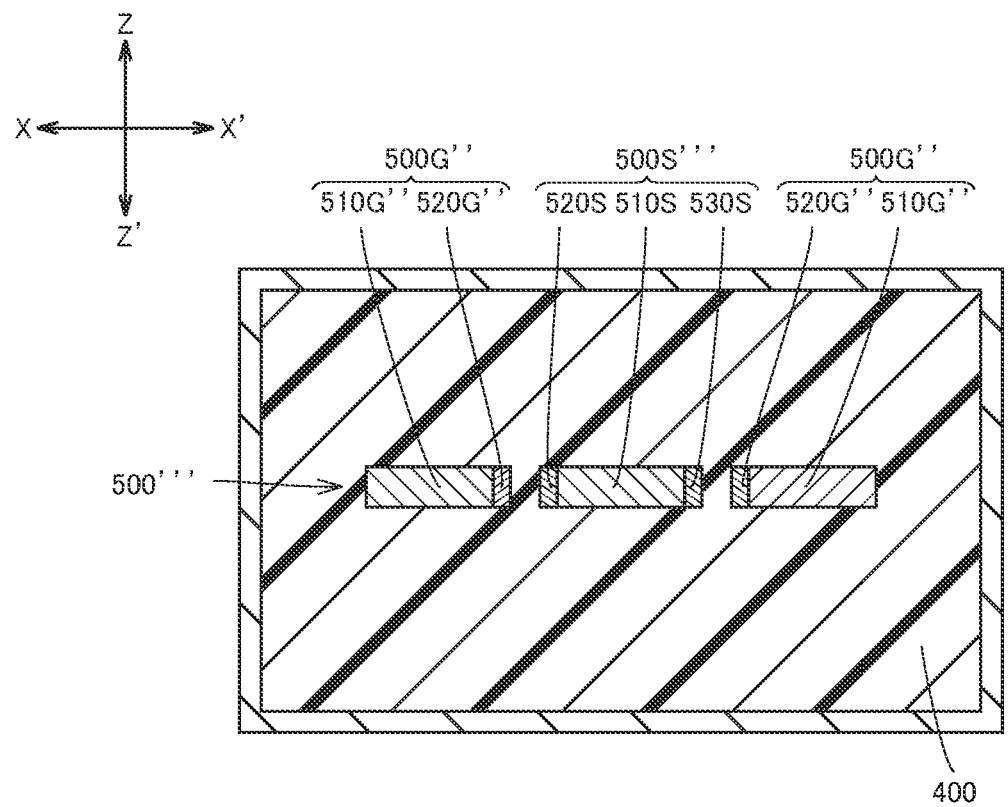
FIG. 8C is a schematic cross-sectional view of a third variant of the high frequency transmission device of the fifth embodiment.

In the third variant connector, as shown in FIG. 8C, a transmission line 500''' includes a pair of plate-shaped ground conductors 500G" provided inside a dielectric 400. The pair of ground conductors 500G" includes first and second ground conductors 500G". The first ground conductor 500G" is arranged on the X-direction side relative to the signal conductor 500S''' and extends along at least part of the signal conductor 500S''', and the second ground conductor 500G" is arranged on the X'-direction side relative to the signal conductor 500S''' and extends along at least part of the signal conductor 500S'''. The pair of ground conductors 500G" and the signal conductor 500S''' form a coplanar line. The signal conductor 500S''' may include a first conductor portion 510S, a second conductor portion 520S, and a third conductor portion 530S. It is preferable that the second conductor portion 520S be provided on the X-direction side relative to the first conductor portion 510S (on the side closer to the first ground conductor 500G"), and the third conductor portion 530S be provided on the X'-direction side relative to the first conductor portion 510S (on the side closer to the second ground conductor 500G"). Each of, or one of, the first ground conductor 500G" and the second ground conductor 500G" may include a first conductor portion 510G" and a second conductor portion 520G". The second conductor portion 520G" of the first ground conductor 500G" may preferably be provided on the X'-direction side relative to the first conductor portion 510G" of the first ground conductor 500G" (on the side closer to the signal conductor 500S'''). The second conductor portion 520G" of the second ground conductor 500G" may preferably be provided on the X-direction side relative to the first conductor portion 510G" of the second ground conductor 500G" (on the side closer to the signal conductor 500S''').

The connector of any of the above aspects may include a plurality of signal conductors of any of the above aspects. In this case, the plurality of signal conductors is held by the dielectric and housed in the ground conductor 500G. The plurality of signal conductors may include first and second signal conductors arranged in spaced relation to each other in the X-X' direction. The ground conductor 500G extends along at least part of each of the plurality of housed signal conductors. Such ground conductor 500G in the dielectric may be replaced with at least one ground conductor 500G'.

Figure 8D:
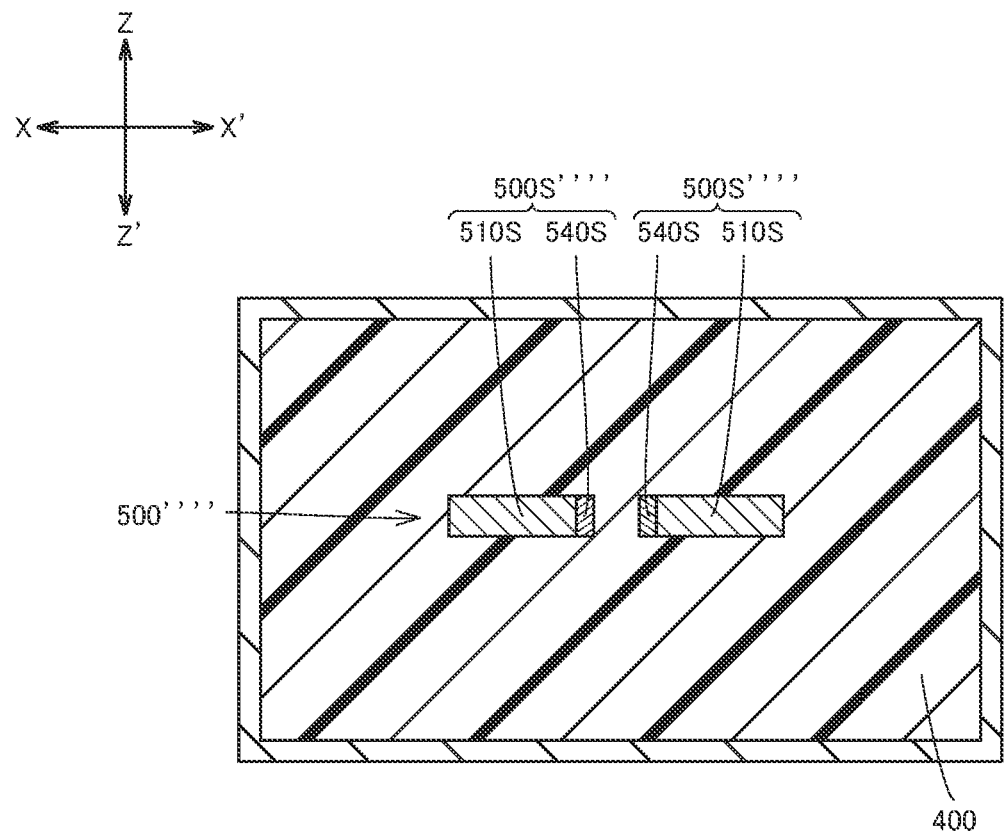
FIG. 8D is a schematic cross-sectional view of a fourth variant of the high frequency transmission device of the fifth embodiment.

Similarly to the transmission board D4, the connector of the invention may include a dielectric 400 and first and second signal conductors 500S"", and the first and second signal conductors 500S"" may form a differential pair of a transmission line 500" (see FIG. 8D). At least part of each of the first and second signal conductors 500S"" are provided inside the dielectric 400, and the first and second signal conductors 500S"" are arranged in spaced relation to each other in the X-X' direction. At least one conductor of the first signal conductor 500S" or the second signal conductor 500S"" may include a first conductor portion 510S and a fourth conductor portion 540S. The first signal conductor 500S may be configured such that the fourth conductor portion 540S thereof is provided on the side closer to the second signal conductor 500S"" than the first conductor portion 510S is. The second signal conductor 500S"" may be configured such that the fourth conductor portion 540S thereof is provided on the side closer to the first signal conductor 500S"" than the first conductor portion 510S is.

Figure 8E:
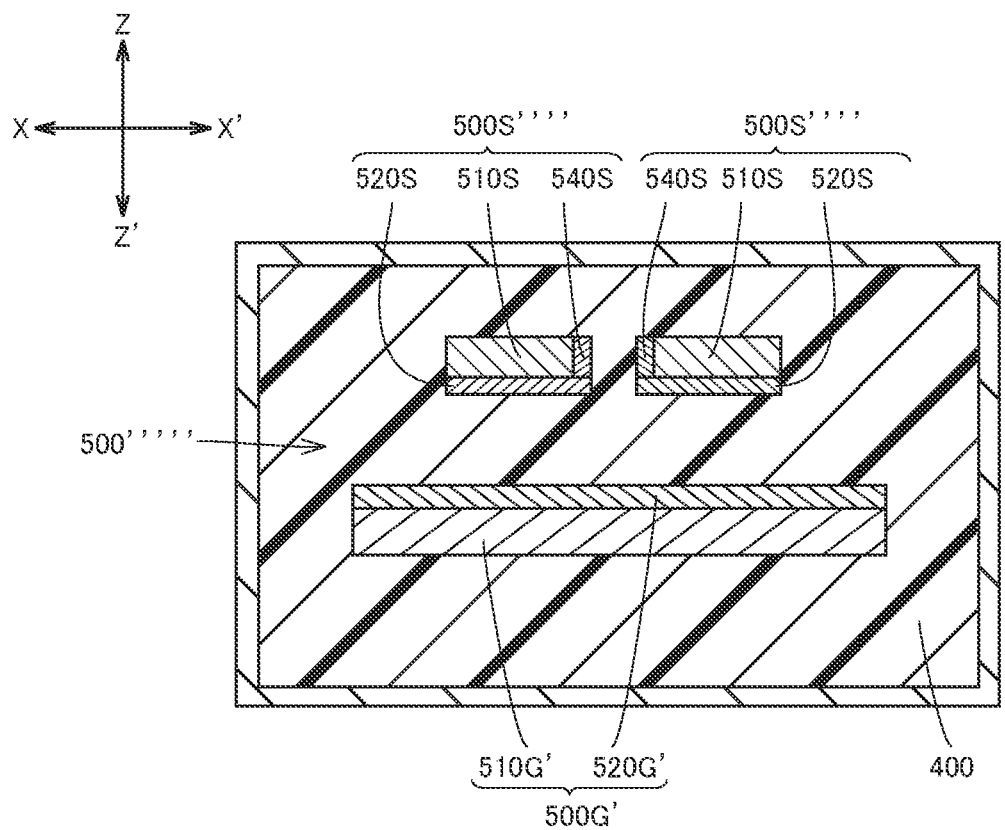
FIG. 8E is a schematic cross-sectional view of a variant of the high frequency transmission device of the fourth variant.

In the fourth variant connector, as shown in FIG. 8E, the transmission line 500''' further includes the ground conductor 500G' arranged on the Z'-direction side relative to the first and second signal conductors 500S"", and each of the first and second signal conductors 500S"" may further include the second conductor portion 520S.

The first and second signal conductors of any of the above aspects may form a differential pair, but the invention is not limited thereto. The first conductor portion(s) of a signal conductor(s) of any of the above variants may further include the first connecting portion and/or the second connecting portion.

FIG. 9 shows a connection structure of an aspect of the invention, which includes a connector including a signal conductor 500S of configuration (a) or (c) above (the connector on the left side of the drawing (hereinafter referred to as a first connector)), and a connector including a signal conductor 500S of configuration (b) or (d) above (the connector on the right side of the drawing (hereinafter referred to as a second connector)). In this case, a distal portion 511S of the signal conductor 500S of the second connector is to be received between the arms of the distal portion 511S of the signal conductor 500S of the first connector. This insertion causes elastic deformation of the pair of arms of the distal portion 511S of the signal conductor 500S of the first connector such that the arms move away from each other. This elastic deformation causes the inner faces (first connecting portion) of the pair of arms of the distal portion 511S of the signal conductor 500S of the first connector to be brought into elastic contact with the outer perimeter face (first connecting portion) of the distal portion 511S of the signal conductor 500S of the second connector.

The inner faces of the pair of arms of the distal portion 511S of the signal conductor 500S of the first connector are not covered by the second conductor portion 520S. The outer perimeter face of the distal portion 511S of the signal conductor 500S of the second connector is not covered by the second conductor portion 520S either. Therefore, the second conductor portion 520S will not be worn or damaged by the elastic contact of the inner faces of the pair of arms of the distal portion 511S of the signal conductor 500S of the first connector with the outer perimeter face of the distal portion 511S of the signal conductor 500S of the second connector.

Furthermore, where the outer face of the pair of arms of the distal portion 511S of the signal conductor 500S of the first connector is not covered by the second conductor portion 520S either, elastic deformation of the arms will not cause damage to the second conductor portion 520S.

A connection structure of another aspect of the invention includes a connector including a signal conductor 500S of configuration (b) or (d) above (hereinafter referred to as a third connector), and a connector including a signal conductor 500S of configuration (b) or (d) above (hereinafter referred to as a fourth connector). In this case, a distal portion 511S of the signal conductor 500S of the third connector is to make sliding or elastic contact with a distal portion 511S of the signal conductor 500S of the fourth connector. At least a contacting surface (first connecting portion) of the distal portion 511S of the signal conductor 500S of each of the third and fourth connectors is not covered by the corresponding second conductor portion 520S. Therefore, the second conductor portions 520S of the signal conductors 500S of the third and fourth connectors will not be worn or damaged by the sliding or elastic contact of the distal portion 511S of the signal conductor 500S of the third connector with the distal portion 511S of the signal conductor 500S of the fourth connector.

In the invention, the at least one conductor of the signal conductor or conductors or the ground conductor or conductors of any of the above aspects may further include a fifth conductor portion, which is provided between a second conductor portion and the dielectric and does not contain the polycrystal above. In the invention, at least one conductor of the signal conductor or conductors or the ground conductor or conductors of any of the above aspects may further include a sixth conductor portion provided between first and second conductor portions.

The conductor fine particles of the invention may be conductor nanoparticles having an average particle size from several nanometers to ten-odd nanometers as described above, but are only required to be conductor fine particles having an average particle size of not greater than several micrometers. The average particle size of the conductor nanoparticles of the invention may be from a sub-nanometer to 100 nanometers.

The resistance reducing material of the invention is only required to be composed of fine particles and have a physical property that where a high frequency signal to be transmitted through a transmission line is of frequencies within one or more specific frequency bands, the AC resistance value drops sharply. In other words, the resistance reducing material may have physical properties that in a case (former case) where a high frequency signal (high frequency signal) to flow through the resistance reducing material is of frequencies in a frequency band other than the one or more specific frequency bands, the high frequency signal causes generation of a magnetic field, and the magnetic field causes generation of an induced electromotive force (counter-electromotive force) in a direction obstructing the flow of the high frequency signal at the central portion of the resistance reducing material. On the other hand, the direction of an induced electromotive force (counter-electromotive force) generated in a central portion of the resistance reducing material is reversed in a case (latter case) where a high frequency signal to flow through the resistance reducing material is of frequencies within the one or more specific frequency bands (frequency band or bands in which magnetic resonance occurs in the resistance reducing material), the induced electromotive force being generated due to a magnetic field generated due to the high frequency signal. Again, in the former case, the real part of the magnetic permeability of the resistance reducing material is positive. In the latter case, the real part of the magnetic permeability of the resistance reducing material is negative. The one or more specific frequency bands of a high frequency signal may be any frequency band or bands in which magnetic resonance occurs in the resistance reducing material by the action of the magnetic field generated by the high frequency signal.

For example, the resistance reducing material of the invention may be composed of semiconductor fine particles capable of exhibiting the above physical properties at ambient temperature. The semiconductor fine particles may preferably, but is not required to, have an average particle size from 1 nanometer to 100 nanometers. The semiconductor fine particles may be intrinsic semiconductor fine particles. The intrinsic semiconductor fine particles may be, but is not required to be, e.g., silicon fine particles, germanium fine particles, diamond fine particles, silicon-germanium fine particles, compound semiconductor fine particles, or the like. The intrinsic conductor fine particles may be monocrystalline, polycrystalline, or amorphous. Also, the semiconductor fine particles may be an impurity semiconductor obtained by doping the above intrinsic semiconductor with impurities.

The resistance reducing material composed of semiconductor fine particles can be used in place of the polycrystal of any of the above aspects. The resistance reducing material composed of semiconductor fine particles can be produced by similar methods to those for the polycrystal of any of the above aspects. In this case, it is preferable to replace the semiconductor fine particles with conductor nanoparticles. The second conductor portion or portions of any of the above aspects may be composed of a resistance reducing material composed of semiconductor fine particles. In this case, the first conductor portion or portions of any of the above aspects may preferably be composed of at least one of the following materials: a material having a DC resistance value that is smaller than that of the second conductor portion, or an anti-oxidant material or other anti-corrosive material. Where a high frequency signal to be transmitted through the transmission line is of frequencies within the one or more specific frequency bands, the AC resistance value of the resistance reducing material of any aspect of the invention is not limited to substantially $0\Omega$ or negative value. The first conductor portion or portions of the invention may be provided only in the first and/or second connecting portion or portions.

It should be noted that the materials, the shapes, the dimensions, the numbers, the positions, etc. of the elements that constitute each component of the high frequency transmission device of various aspects in the above-described embodiments and their variants are presented by way of example only and can be modified in any manner as long as the same functions can be fulfilled. The aspects in the above-described embodiments and their variants can be combined in any possible manner. When used herein, "generally ring-shape" is a concept including a circular ring shape, a polygonal ring shape, a circular ring shape with a cut-away portion, and a polygonal ring shape with a cut-away portion.

REFERENCE SIGNS LIST

D1 to D4: high frequency transmission device (transmission board)
  100, 100': dielectric
    101, 101': first face
    102, 102': first face
  200, 200', 200", 200''': transmission line
    S, S', S", S''': signal conductor
      S1, S1', S1''': first conductor portion of signal conductor
      S2, S2', S2": second conductor portion of signal conductor
      S3', S3": third conductor portion of signal conductor
      S4''': fourth conductor portion of signal conductor
    G: ground conductor (first ground conductor)
    G': ground conductor (second ground conductor)
    G": ground conductor (first or second ground conductor)
      G1, G1', G1": first conductor portion of ground conductor
      G2, G2', G2": second conductor portion of ground conductor
  300: transmitter D5: high frequency transmission device (connector)
  400: dielectric
  500: transmission line
    500S: signal conductor
      510S: first conductor portion of signal conductor
      520S: second conductor portion of signal conductor
    500G: ground conductor
      510G: first conductor portion of ground conductor
      520G: second conductor portion of ground conductor

The invention claimed is:

1. A high frequency transmission device comprising:
a dielectric; and
a transmission line adapted for transmitting therethrough high frequency signals, wherein
at least part of the transmission line is located on or inside the dielectric,
at least part of the transmission line is composed of a resistance reducing material composed of fine particles,
the resistance reducing material has a physical property that where a high frequency signal to be transmitted through the transmission line is of frequencies within one or more specific frequency bands, an alternating current resistance value of the resistance reducing material drops sharply, as compared with an alternating current resistance value in a case where a high frequency signal to flow through the transmission line is of frequencies outside the one or more specific frequency bands,
the transmission line comprises
at least one signal conductor, at least part of the or each signal conductor is provided on or inside the dielectric, and
a first ground conductor extending along at least part of the or each signal conductor, the or each signal conductor includes
a first signal conductor portion having a direct-current resistance value that is smaller than that of the resistance reducing material, and
a second signal conductor portion composed of the resistance reducing material and arranged on a side closer to the first ground conductor than the first signal conductor portion is, and
the first ground conductor includes
a first ground conductor portion having a direct-current resistance value that is smaller than that of the resistance reducing material, and
a second ground conductor portion composed of the resistance reducing material and arranged on a side closer to the at least one signal conductor than the first ground conductor portion of the first ground conductor is.

2. The high frequency transmission device according to claim 1, wherein
the transmission line further comprises a second ground conductor extending along at least part of the or each signal conductor, and
the first ground conductor is arranged on one side relative to the at least one signal conductor, and the second ground conductor is arranged on the other side relative to the at least one signal conductor.

3. The high frequency transmission device according to claim 2, wherein
the or each signal conductor further includes a third signal conductor portion composed of the resistance reducing material, and
the second signal conductor portion of the or each signal conductor is arranged on a side closer to the first ground conductor than the first signal conductor portion of the corresponding signal conductor is, and the third signal conductor portion of the or each signal conductor is arranged on a side closer to the second ground conductor than the first signal conductor portion of the corresponding signal conductor is.

4. The high frequency transmission device according to claim 3, wherein the third signal conductor portion of the or each signal conductor is fixed to at least part of the first signal conductor portion of the corresponding signal conductor.

5. The high frequency transmission device according to claim 2, wherein
the second ground conductor includes:
a first ground conductor portion having a direct-current resistance value that is smaller than
that of the resistance reducing material; and
a second ground conductor portion composed of the resistance reducing material, and
the second ground conductor portion of the second ground conductor is arranged on a side closer to the at least one signal conductor than the first ground conductor portion of the second ground conductor is.

6. The high frequency transmission device according to claim 1, wherein
the at least one signal conductor of the transmission line comprises a first signal conductor and a second signal conductor arranged side-by-side, at least part of each of the first and second signal conductors being provided at the dielectric, and
at least one conductor of the first signal conductor or the second signal conductor further includes:
a fourth signal conductor portion composed of the resistance reducing material and arranged on a side closer to the other conductor than the first signal conductor portion of the one conductor is.

7. The high frequency transmission device according to claim 6, wherein the fourth signal conductor portion is fixed to at least part of the corresponding first signal conductor portion.

8. The high frequency transmission device according to claim 1, wherein
the fine particles are conductor fine particles, and
the resistance reducing material is composed of a polycrystal composed of the conductor fine particles.

9. The high frequency transmission device according to claim 1, wherein
the fine particles are semiconductor fine particles, and
the resistance reducing material is composed of the semiconductor fine particles.

10. The high frequency transmission device according to claim 1, wherein the second signal conductor portion of the or each signal conductor is fixed to at least part of the first signal conductor portion of the corresponding signal conductor, and
the second ground conductor portion is fixed to at least part of the first ground conductor portion.

11. The high frequency transmission device according to claim 1, wherein
the first ground conductor is generally ring-shaped in a cross-sectional view in an orthogonal direction orthogonal to a length direction of the first ground conductor, and surrounds the at least one signal conductor, and the second signal conductor portion of the or each signal conductor is generally ring-shaped in a cross-sectional view in the orthogonal direction, and is provided on an outer perimeter face of at least part of the first signal conductor portion of the corresponding signal conductor.

12. The high frequency transmission device according to claim 1, wherein
the first ground conductor portion of the first ground conductor is generally ring-shaped in a cross-sectional view in an orthogonal direction orthogonal to a length direction of the first ground conductor, and surrounds the at least one signal conductor, and
the second ground conductor portion of the first ground conductor is generally ring-shaped in a cross-sectional view in the orthogonal direction, and is provided on an inner perimeter face of at least part of the first ground conductor portion of the first ground conductor.

13. The high frequency transmission device according to claim 1, wherein
the at least one signal conductor comprises a pair of signal conductors including a first signal conductor and a second signal conductor arranged side-by-side, and
one conductor of the first signal conductor and the second signal conductor further includes a fourth signal conductor portion composed of the resistance reducing material and arranged on a side closer to the other conductor than the first signal conductor portion of the one conductor is.

14. The high frequency transmission device according to claim 5, wherein
the at least one signal conductor comprises a pair of signal conductors including a first signal conductor and a second signal conductor arranged side-by-side, and
each of the first signal conductor and the second signal conductor further includes a fourth signal conductor portion composed of the resistance reducing material,
the fourth signal conductor portion of the first signal conductor is arranged on a side closer to the second signal conductor than the first signal conductor portion of the first signal conductor is, and
the fourth signal conductor portion of the second signal conductor is arranged on a side closer to the first signal conductor than the first signal conductor portion of the second signal conductor is.

15. A high frequency transmission device comprising:
a dielectric; and
a transmission line adapted for transmitting therethrough high frequency signals, wherein
at least part of the transmission line is located on or inside the dielectric,
at least part of the transmission line is composed of a resistance reducing material composed of fine particles,
the resistance reducing material has a physical property that a direction of an induced electromotive force (counter-electromotive force) generated in a central portion of the resistance reducing material is reversed in a case where a high frequency signal to be transmitted through the transmission line is of frequencies within one or more specific frequency bands, the induced electromotive force being generated due to a magnetic field generated due to the high frequency signal,
the transmission line comprises
at least one signal conductor, at least part of the or each signal conductor is provided on or inside the dielectric, and
a first ground conductor extending along at least part of the or each signal conductor, and
the or each signal conductor includes
a first signal conductor portion having a direct-current resistance value that is smaller than that of the resistance reducing material, and
a second signal conductor portion composed of the resistance reducing material and arranged on a side closer to the first ground conductor than the first signal conductor portion is, and
the first ground conductor includes
a first ground conductor portion having a direct-current resistance value that is smaller than that of the resistance reducing material, and
a second ground conductor portion composed of the resistance reducing material and arranged on a side closer to the at least one signal conductor than the first ground conductor portion of the first ground conductor is.

16. The high frequency transmission device according to claim 15, wherein
the transmission line further comprises a second ground conductor extending along at least part of the or each at least one signal conductor, and
the first ground conductor is arranged on one side relative to the at least one signal conductor, and the second ground conductor is arranged on the other side relative to the at least one signal conductor.

17. The high frequency transmission device according to claim 16, wherein
the or each signal conductor further includes a third signal conductor portion composed of the resistance reducing material, and
the second signal conductor portion of the or each signal conductor is arranged on a side closer to the first ground conductor than the first signal conductor portion of the corresponding signal conductor is, and the third signal conductor portion of the or each signal conductor is arranged on a side closer to the second ground conductor than the first signal conductor portion of the corresponding signal conductor is.

18. The high frequency transmission device according to claim 17, wherein the third signal conductor portion of the or each signal conductor is fixed to at least part of the first signal conductor portion of the corresponding signal conductor.

19. The high frequency transmission device according to claim 16, wherein
the second ground conductor includes:
a first ground conductor portion having a direct-current resistance value that is smaller than that of the resistance reducing material; and
a second ground conductor portion composed of the resistance reducing material, and
the second ground conductor portion of the second ground conductor is arranged on a side closer to the at least one signal conductor than the first ground conductor portion of the second ground conductor is.

20. The high frequency transmission device according to claim 15, wherein
the at least one signal conductor of the transmission line comprises a first signal conductor and a second signal conductor arranged side-by-side, at least part of each of the first and second signal conductors being provided at the dielectric, and
at least one conductor of the first signal conductor or the second signal conductor further includes:

a fourth signal conductor portion composed of the resistance reducing material and arranged on a side closer to the other conductor than the first signal conductor portion of the one conductor is.

21. The high frequency transmission device according to claim 20, wherein the fourth signal conductor portion is fixed to at least part of the corresponding first signal conductor portion.

22. The high frequency transmission device according to claim 15, wherein
the fine particles are conductor fine particles, and
the resistance reducing material is composed of a polycrystal composed of the conductor fine particles.

23. The high frequency transmission device according to claim 15, wherein
the fine particles are semiconductor fine particles, and
the resistance reducing material is composed of the semiconductor fine particles.

24. The high frequency transmission device according to claim 15, wherein
the second signal conductor portion of the or each signal conductor is fixed to at least part of the first signal conductor portion of the corresponding signal conductor, and
the second ground conductor portion is fixed to at least part of the first ground conductor portion.

25. The high frequency transmission device according to claim 15, wherein
the first ground conductor is generally ring-shaped in a cross-sectional view in an orthogonal direction orthogonal to a length direction of the first ground conductor, and surrounds the at least one signal conductor, and
the second signal conductor portion of the or each signal conductor is generally ring-shaped in a cross-sectional view in the orthogonal direction, and is provided on an outer perimeter face of at least part of the first signal conductor portion of the corresponding signal conductor.

26. The high frequency transmission device according to claim 15, wherein
the first ground conductor portion of the first ground conductor is generally ring-shaped in a cross-sectional view in an orthogonal direction orthogonal to a length direction of the first ground conductor, and surrounds the at least one signal conductor, and
the second ground conductor portion of the first ground conductor is generally ring-shaped in a cross-sectional view in the orthogonal direction, and is provided on an inner perimeter face of at least part of the first ground conductor portion of the first ground conductor.

27. A high frequency transmission device comprising:
a dielectric; and
a transmission line adapted for transmitting therethrough high frequency signals, wherein
at least part of the transmission line is located on or inside the dielectric,
at least part of the transmission line is composed of a resistance reducing material composed of fine particles,
the resistance reducing material has a physical property that a direction of an induced electromotive force (counter-electromotive force) generated in a central portion of the resistance reducing material is reversed in a case where a high frequency signal to be transmitted through the transmission line is of frequencies within one or more specific frequency bands, the induced electromotive force being generated due to a magnetic field generated due to the high frequency signal,
the transmission line comprises
at least one signal conductor, at least part of the or each signal conductor is provided on or inside the dielectric, and
a first ground conductor extending along at least part of the or each signal conductor, at least one conductor of the at least one signal conductor and the first ground conductor includes
a first conductor portion having a direct-current resistance value that is smaller than that of the resistance reducing material, and
a second conductor portion composed of the resistance reducing material and arranged on a side closer to the other conductor than the first conductor portion is,
the at least one signal conductor comprises a pair of signal conductors including a first signal conductor and a second signal conductor arranged side-by-side, and
one conductor of the first signal conductor and the second signal conductor further includes a fourth conductor portion composed of the resistance reducing material and arranged on a side closer to the other conductor than the first conductor portion of the one conductor is.

28. The high frequency transmission device according to claim 27, wherein
the first signal conductor comprises the first conductor portion and the fourth conductor portion,
the second signal conductor comprises another first conductor portion and another fourth conductor portion,
the fourth conductor portion of the first signal conductor is arranged on a side closer to the second signal conductor than the first conductor portion of the first signal conductor is, and
the fourth conductor portion of the second signal conductor is arranged on a side closer to the first signal conductor than the first conductor portion of the second signal conductor is.

* * * * *